(12) United States Patent
Piña et al.

(10) Patent No.: US 12,103,833 B2
(45) Date of Patent: Oct. 1, 2024

(54) AUTOMATIC GUIDED VEHICLE (AGV)

(71) Applicant: Grupo Bimbo, S.A.B. de C.V., D.F. C.P. (MX)

(72) Inventors: Christian Daniel Del Moral Piña, San Mateo Atenco (MX); Jesús Emmanuel Hernández Mendoza, Metepec (MX); Emillo Ramirez Flores, Otzolotepec (MX); Alejandra Del Carmen Fuentes, Lerma (MX); Kevin Alejandro Díaz Rodríguez, Metepec (MX); Edgar Guzmán Ramírez, San Mateo Atenco (MX); Julio Jordán Garduño Nava, Rayon (MX); Juan Carlos Vázquez Gómez, Metepec (MX); Juan Manuel García Osnaya, Temoaya (MX); Carlos Alberto Morales Suárez, Tenango del Valle (MX)

(73) Assignee: Grupo Bimbo, S.A.B. de C.V., Santa Fe, D.F. C.P. (MX)

( * ) Notice: Subject to any disclaimer, the term of this patent is extended or adjusted under 35 U.S.C. 154(b) by 466 days.

(21) Appl. No.: 17/410,730

(22) Filed: Aug. 24, 2021

(65) Prior Publication Data
US 2022/0063970 A1 Mar. 3, 2022

(51) Int. Cl.
*B60L 53/00* (2019.01)
*B60L 53/14* (2019.01)
(Continued)

(52) U.S. Cl.
CPC ............ *B66F 9/0755* (2013.01); *B60L 53/14* (2019.02); *G05D 1/0212* (2013.01); *B60L 2200/42* (2013.01)

(58) Field of Classification Search
CPC ............... B66F 9/0755; B66F 9/07504; B66F 9/07513; B66F 9/063; B60L 53/14; B60L 2200/42; B60L 2200/44; B60L 2240/12; B60L 2240/24; B60L 2240/32; B60L 2240/62; B60L 2260/32; B60L 3/0038; B60L 3/0092; B60L 50/60; B60L 53/36; B60L 53/80; G05D 1/0212;
(Continued)

(56) References Cited

U.S. PATENT DOCUMENTS

2019/0366867 A1* 12/2019 Gariepy ................. B60L 53/66

FOREIGN PATENT DOCUMENTS

| CA | 2760127 A1 * | 11/2009 | .......... B60L 15/2036 |
| CN | 108655804 A * | 10/2018 | .......... B23Q 7/1431 |

(Continued)

*Primary Examiner* — Saul Rodriguez
*Assistant Examiner* — Lucia Elba Rodriguez
(74) *Attorney, Agent, or Firm* — Crowell & Moring LLP; John C. Freeman

(57) ABSTRACT

The lift truck automatic guided vehicle (AGV) generally comprises a chassis, a compartment for the attachment of a tower, a counterweight in the rear part, a battery box and power and control boards on opposite sides of the base chassis, a casing and a front lifting system constituted by a support mast, a lifting carriage, a lifting cylinder, a raising carriage, a fork hanger and two front forks. The chassis is supported by two sets of double front wheels, two free wheels in the rear part and a central driving and steered wheel coupled to an electric motor.

30 Claims, 19 Drawing Sheets

(51) Int. Cl.
  *B66F 9/075* (2006.01)
  *G05D 1/00* (2006.01)
(58) Field of Classification Search
  CPC . G05D 2201/0216; Y02P 90/60; Y02T 10/70;
       Y02T 10/7072; Y02T 10/72; Y02T 90/12;
           Y02T 90/14; Y02T 90/16
  See application file for complete search history.

(56) References Cited

FOREIGN PATENT DOCUMENTS

| | | | | | |
|---|---|---|---|---|---|
| CN | 109333130 | A | * | 2/2019 | ............. B23Q 17/00 |
| CN | 209258287 | U | * | 8/2019 | ............. B62D 63/02 |
| JP | 3341490 | B2 | | 11/2002 | |
| WO | WO 2019/095803 | A1 | | 5/2019 | |
| WO | WO 2020/078335 | A1 | | 4/2020 | |
| WO | WO-2021070068 | A1 | * | 4/2021 | ............. B60L 53/32 |

* cited by examiner

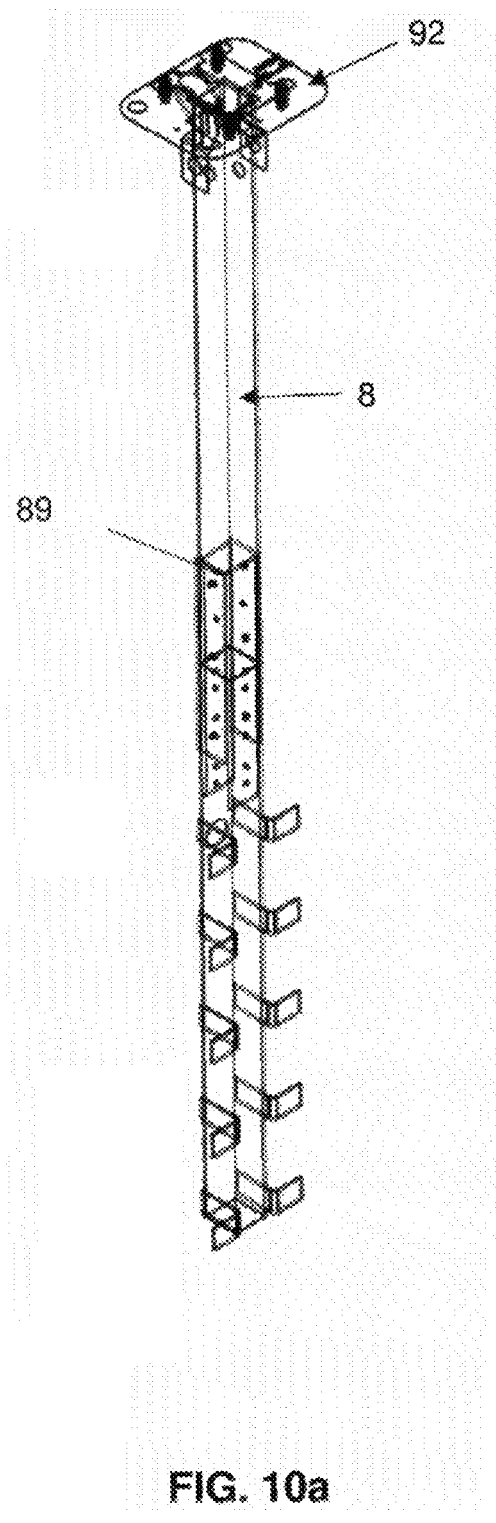 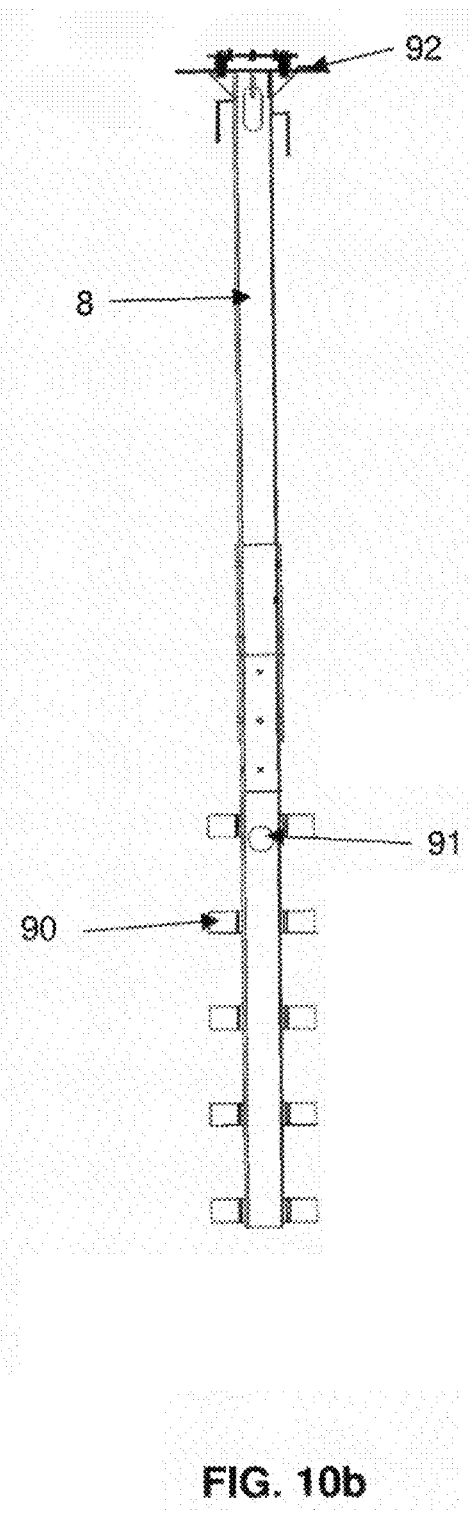
FIG. 10a
FIG. 10b

AUTOMATIC GUIDED VEHICLE (AGV)

RELATED APPLICATIONS

This application claims priority to Mexican application No. MX/a/2020/008872 filed on Aug. 25, 2020, the entire contents of which are incorporated herein by reference in their entirety."

BACKGROUND

1. Technical Field

The present invention belongs generally to the field of industry and storage devices automatically guided by means of routes programmed for the movement of goods within warehouses and production lines. In particular, it relates to an automatic guided vehicle having the capacity of moving product, in a secure manner, from a point "A" to a point "B" by means of the implementation of positioning and safety systems.

2. Background Information

AGVs (automatic guided vehicles) are autonomous vehicles, without a driver, which realise the supply of materials in sequenced processes. By means of this the logistics of companies will be more secure and almost free of errors which diminish productivity and efficacy.

The autonomy of this type of transport within the interior of a building permits the transport of loads to the position thereof, programming the route which it must follow by means of a traffic control centre which permits the vehicle to circulate and not collide with others realising this work, materials, or workers present at that moment. In order to comply with the principal characteristic thereof of navigating or circulating as an autonomous vehicle not requiring the intervention of a human being as driver of the same, these vehicles dispose of diverse guiding systems and of a complex system of control and management, permitting the differentiation of two large groups: those the system of management and control whereof does not communicate with the environment wherein they move, that is to say that they are autonomous and the system solely manages the fleet of vehicles obliging them work in an automatic manner and without interacting with the environment, or complex AGV systems wherein fluid communications with the environment are habitual and fundamental, by virtue of the fact that through these communications the orders of the vehicles and the movements to be realised are managed at all times, communicating with plant maintenance systems, automatic doors, automatic warehouses, and with the company's management software, whether of the type ERP, WMS, etc.

Automatic guided vehicles (AGVs) move along routes programmed for the movement of goods within warehouses and production lines, these vehicles making use of navigation sensors together with references installed in the warehouses or production lines, they being equipped with safety devices such as safety laser scanners in order to comply with the industrial and machinery safety regulations of the country wherein they are marketed, by virtue of the high degree of interaction thereof with the personnel of the warehouses or production line.

There presently exist several proposals in relation to automatic guided vehicles. For example, the Japanese patent JP 3341490 B2 reveals a system and automatic guided vehicle equipped with a means of control and a journey route layout map stored in a prior manner in this means of control. When each AGV receives a transport command in a wireless manner from the controller on the land side, the driving wheels are operated and the distance of displacement is monitored by means of an encoder detecting the number of revolutions of the driving wheels, and the vehicle travels to the destination position in accordance with the design of the map. It is designed to function in an entirely autonomous manner. However, in spite of the fact that the vehicle is fully autonomous, there exists the possibility that the vehicle may deviate slightly from the predetermined route due to the sliding of the driving wheels. As a consequence thereof, a laser light is emitted from the laser light emitting/receiving means towards a plurality of reflectors, such as a reflective tape provided upon the surface of the wall of the displacement space (this installation position is also stored in a prior manner in the means of control). The position of the subject is assessed by triangulation as a function of the quantity (direction of distance to reflector A) and the direction of the reflected light projected from the reflector A and corrects the deviation from the predetermined route to the objective position with precision. The present invention also makes use of positioning sensors however, differing from the Japanese patent, it additionally utilises a navigation and safety sensor to maintain the vehicle within the preestablished trajectory and furthermore makes use of safety systems, such as angular position sensors simultaneously measuring the changes in angular and linear position with respect to a reference position when a given load is being lifted.

Another document of the state of the art is the international patent application WO 2019095803 A1 describing a system including: a control mechanism, a displacement mechanism in communication with the control mechanism, a support structure in the displacement mechanism, and a positioning mechanism in communication with the control mechanism. The support structure includes: a revolving member of the shaft B, the revolving member of the shaft B being rotationally connected to the displacement mechanism, an oscillating member of the shaft A, the oscillating member of the shaft being rotationally connected to the revolving member of the shaft B; a support member connected to the oscillating member of the shaft A. The positioning mechanism is a visual positioning mechanism. Preferably, there is provided a stepper motor linear actuator mechanism in the oscillation member of the shaft A, and the stepper motor linear actuator mechanism is in communication with the control mechanism. Furthermore, there is provided an oblique angle sensor in the oscillating member of the shaft A, and the oblique angle sensor is in communication with the control mechanism, being a flexible recovery board. In the same manner as in the present invention, the AGV vehicle of the international patent application WO 2019095803 A1 utilises an angular positioning sensor, however it does not present devices such as a lifting system having forks actuated by a lifting cylinder, a central driving and steered wheel, a Banner tower, nor side doors upon the covering casing for the installation or withdrawal of the control and power receptacles as in the present invention, additionally nor does this international patent application divulge a proximity sensor.

Finally, the international patent application WO 2020078335 A1 reveals an AGV including a forwards and backwards movement cylinder, an on board electronic navigation control and numerical control device, a support for forwards and backwards movement of the lift truck and a supporting vertical movement, laser safety systems, a navigation system and an angular positioning system. As may be observed, the international patent application WO 2020078335 A1 reveals the same navigation and safety components as the present invention, however the components are not located upon a Banner tower, furthermore the present invention presents a configuration of fixed and mobile wheels affording greater mobility thereto, and a central driving and steered wheel contributing to maintaining the chassis of the proposed AGV vehicle balanced during lifting manoeuvres. The present invention furthermore differs from the international patent application WO 2020078335 A1 by virtue of the fact that it utilises safety mechanisms such as a proximity sensor.

No AGV vehicle known presents a structure of a chassis mounted upon fixed front wheels and free side wheels, having a driving and steered wheel centrally placed to balance the load lifted and improve the traction of the vehicle when ascending and descending, furthermore none of those presently proposed utilises a Banner tower to accommodate a navigation sensor and accessories such as a Moxa access point and strobe lights, nor a configuration of simple and efficient components in the lifting system as demonstrated in the present invention. As a consequence, there exists the requirement for an AGV lift truck vehicle overcoming all the disadvantages of those developed in the past.

BRIEF SUMMARY

The purpose of the present invention is to contribute a design for vehicles guided automatically by means of programmed routes for the movement of goods within warehouses and production lines, the same employing navigation sensors in conjunction with references installed in the warehouses or production lines and being equipped with safety devices, such as safety laser scanners, in order to comply with the industrial and machinery safety regulations of the country wherein they are marketed by virtue of the high degree of interaction thereof with the personnel of the warehouses or production line. Furthermore, the invention presents a system of reliable navigation and traffic control of the vehicles found in the plant in order to prevent collisions and optimise the efficiency of the same, the development of a system of automatic battery charging operating in an uninterrupted manner and requiring low maintenance, and compliance with the industrial and machinery safety regulations in force for the country wherein the vehicle is marketed.

BRIEF DESCRIPTION OF THE DRAWINGS

FIG. 10a is a perspective view of the Banner tower of the AGV lift truck vehicle of the present invention.

FIG. 10b is a front view of the Banner tower of the AGV lift truck vehicle of the present invention.

DETAILED DESCRIPTION OF THE DRAWINGS AND THE PRESENTLY PREFERRED EMBODIMENTS

Figure 1A:
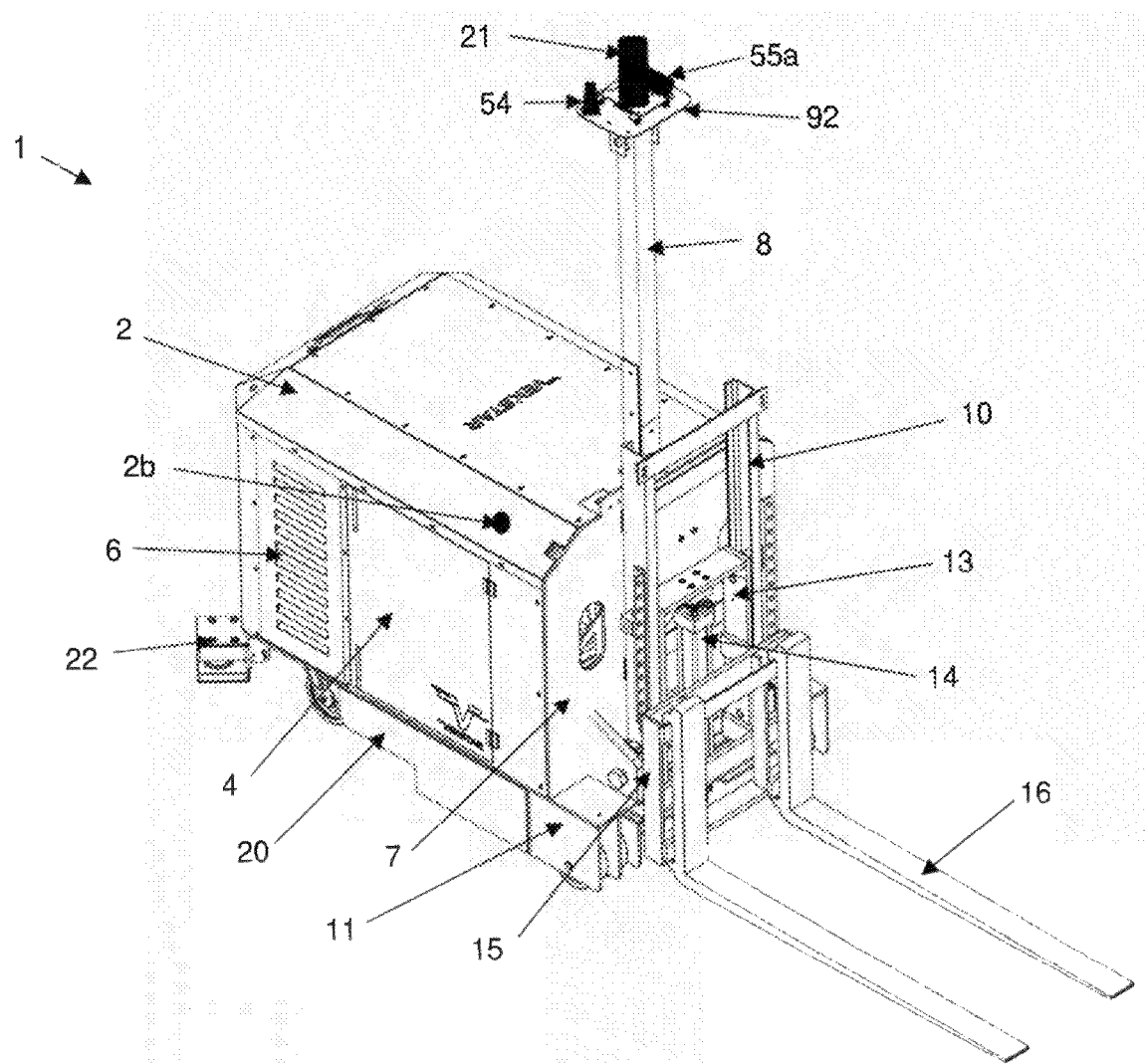
FIG. 1a is a front perspective view of the AGV lift truck vehicle of the present invention.
Figure 1B:
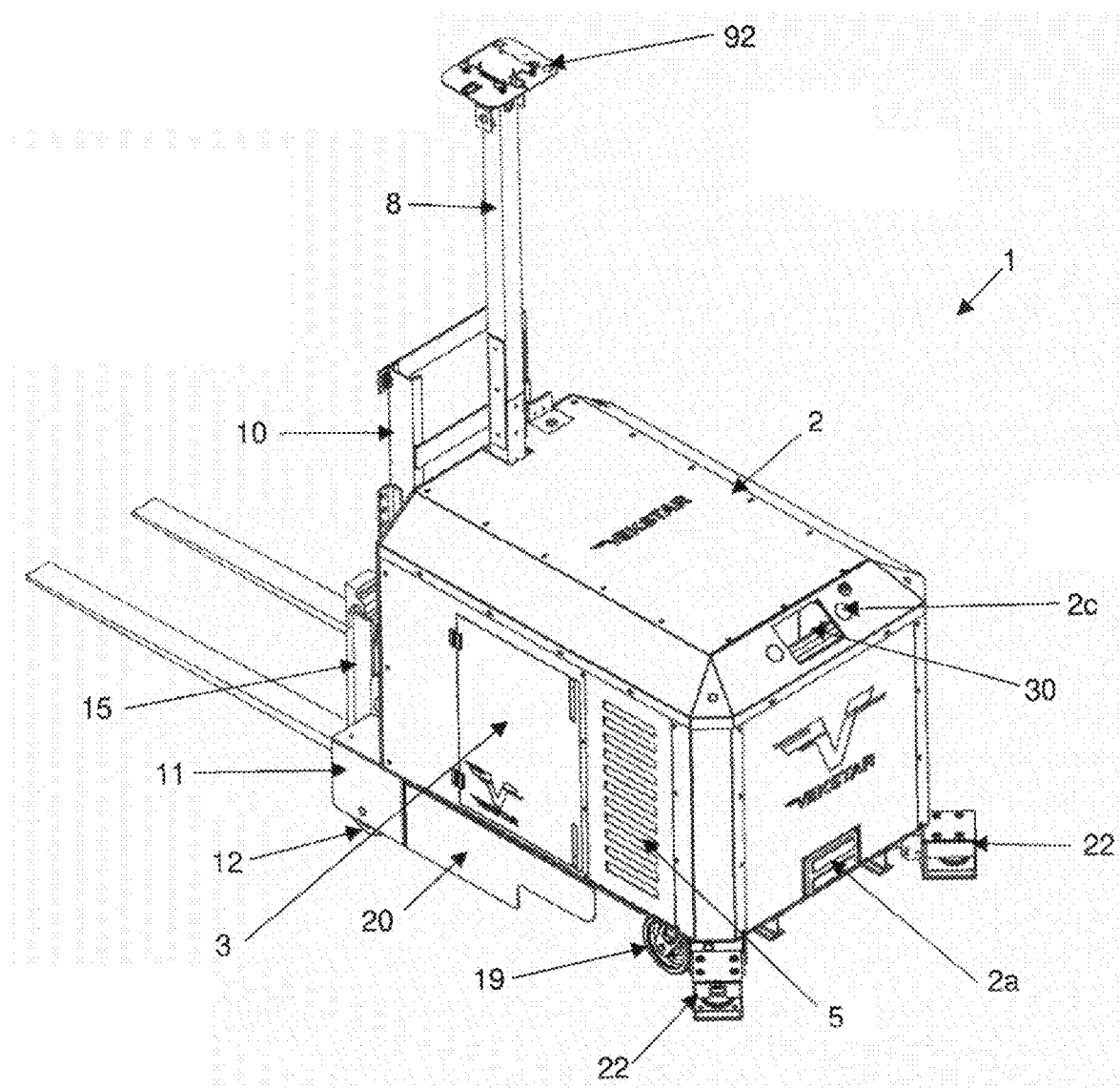
FIG. 1b is a rear perspective view of the AGV lift truck vehicle of the present invention.
Figure 1C:
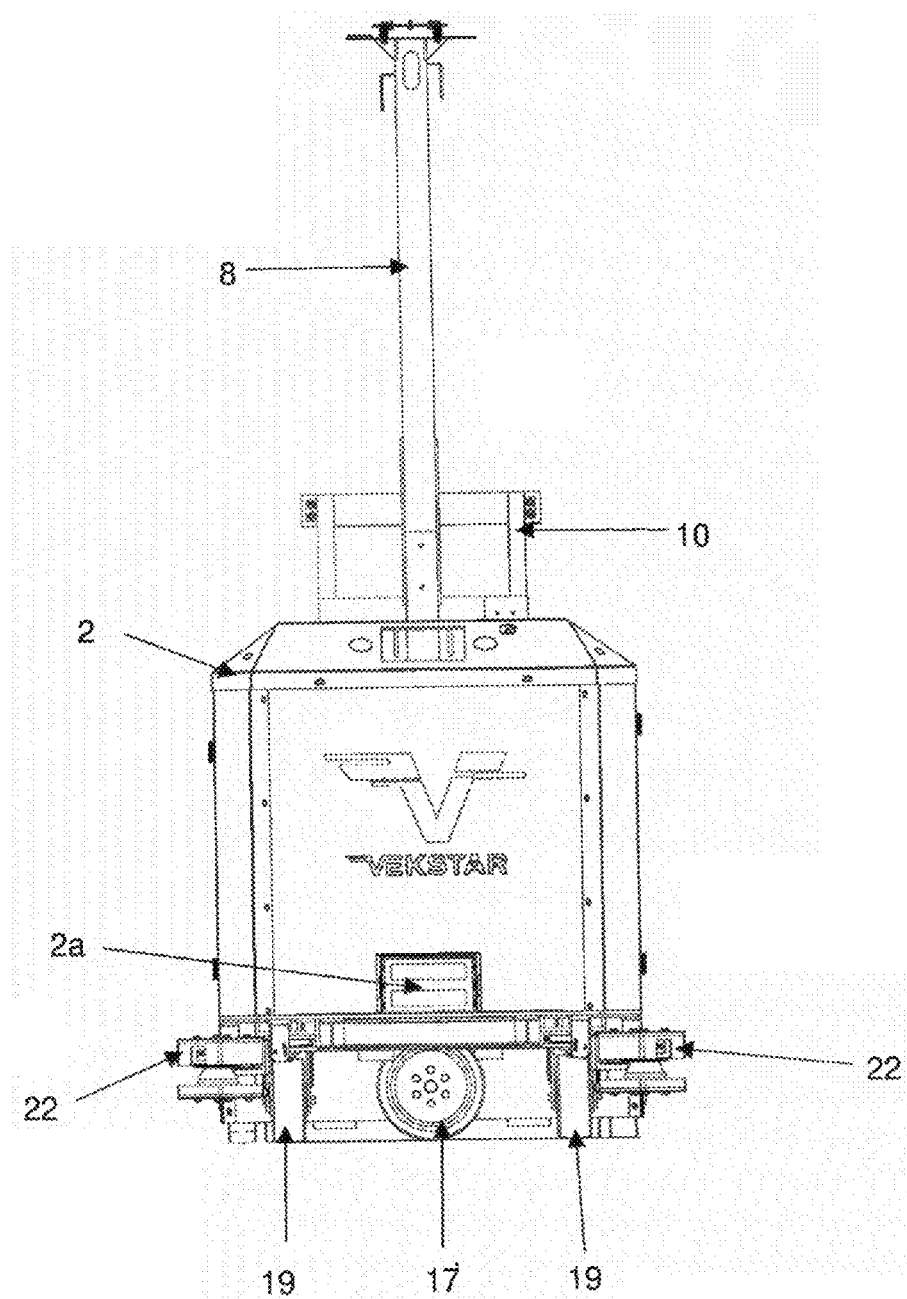
FIG. 1c is a rear view of the AGV lift truck vehicle of the present invention.
Figure 1D:
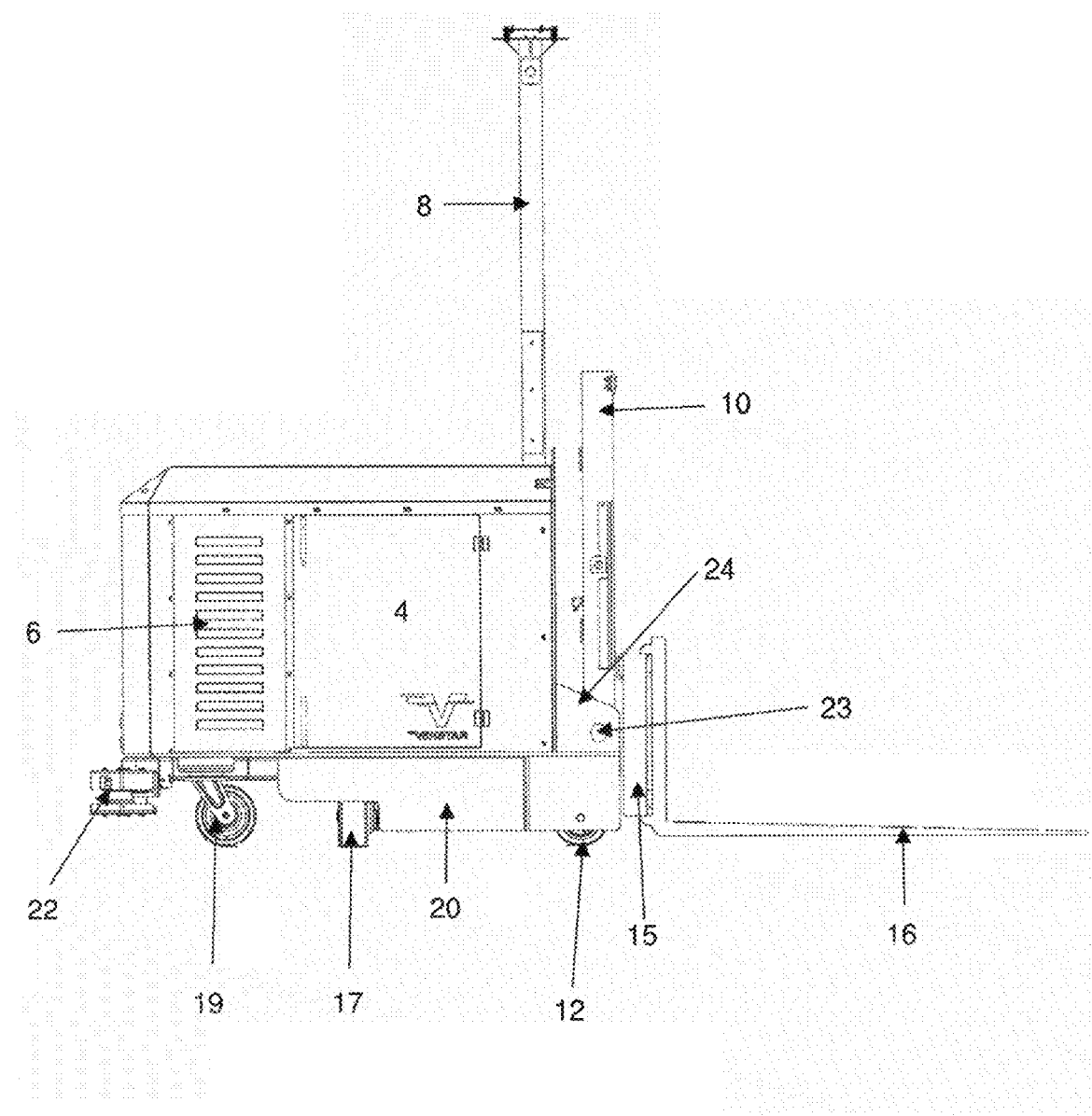
FIG. 1d is a left-hand side view of the AGV lift truck vehicle of the present invention.

In the first place, it must be clearly understood that similar reference numbers are utilised to identify the same structural elements, sections, or surfaces in a consistent manner in the various drawings, by virtue of the fact that such elements, sections, or surfaces can be explained or described in greater depth in the complete written specification whereof this detailed description is an integral part.

The embodiments described in the present document comprise a combination of advantages and characteristics destined to overcome diverse deficiencies associated with certain previous devices, systems, and methods. The aforestated has delineated in a broader manner the technical characteristics and advantages of the embodiments divulged in order that the following detailed description may be better understood. The different characteristics and advantages described previously, together with others, shall be evident to those skilled in the art once having read the detailed description and through the consultation of the appended figures. It must be appreciated that the conception and the specific embodiments divulged may be readily utilised as a basis to modify or design other devices or vehicles in order to achieve the same ends as the embodiments divulged. It must also be understood that such equivalent devices or vehicles do not diverge from the spirit and scope of the principles divulged in this document.

The present divulgement refers to a design of an automatically guided vehicle belonging to the AGV (automatic guided vehicle) type, in particular the present divulgement relates to an automatically guided electric lift truck vehicle presenting the ability to move products from a point "A" to a point "B" together with being compliant with the safety standard ANSI/ISTDF B56.5 for industrial autonomous vehicles.

It is equipped with an automatic battery charging system of as and when required type to reduce the involvement of personnel in the operation of the vehicle, and it presents a comprehensive safety system enabling it to stop the vehicle upon detection of a fault in the various systems constituting the operation of the vehicle; within this safety system there is included the detection of objects or persons obstructing the passage of the vehicle together with emergency stops located at different points of the vehicle, audible alarm and visual alarms, such that the vehicle may interact with the personnel of the plant and/or warehouse.

More than one unit of this same vehicle may operate in the same warehouse and/or production line by virtue of the fact that it has the capacity of being able to work under a control regulating the movement and operations of these vehicles.

For the purposes of the display of alarm messages, state of the tasks, and calibration, the lift truck vehicle of the present invention presents a user interface comprising a touch screen located upon the casing of the vehicle.

In relation to the drawings, and more particularly to FIGS. 1a, 1b, 1c and 1d, there is provided a general view of the automatic guided vehicle (1) presented fully assembled. Within the principal components of the present invention there is an automatic lift truck vehicle having as principal components a very robust metal chassis (described below) covered by a protective casing (2) of compact design permitting it to move freely through narrow corridors or passages within the warehouses or plants. The protective casing (2) has two side doors (3, 4), one in each side wall of the casing (2), for the purpose of connecting the power board (28) and the control board (27), respectively.

Figure 2:
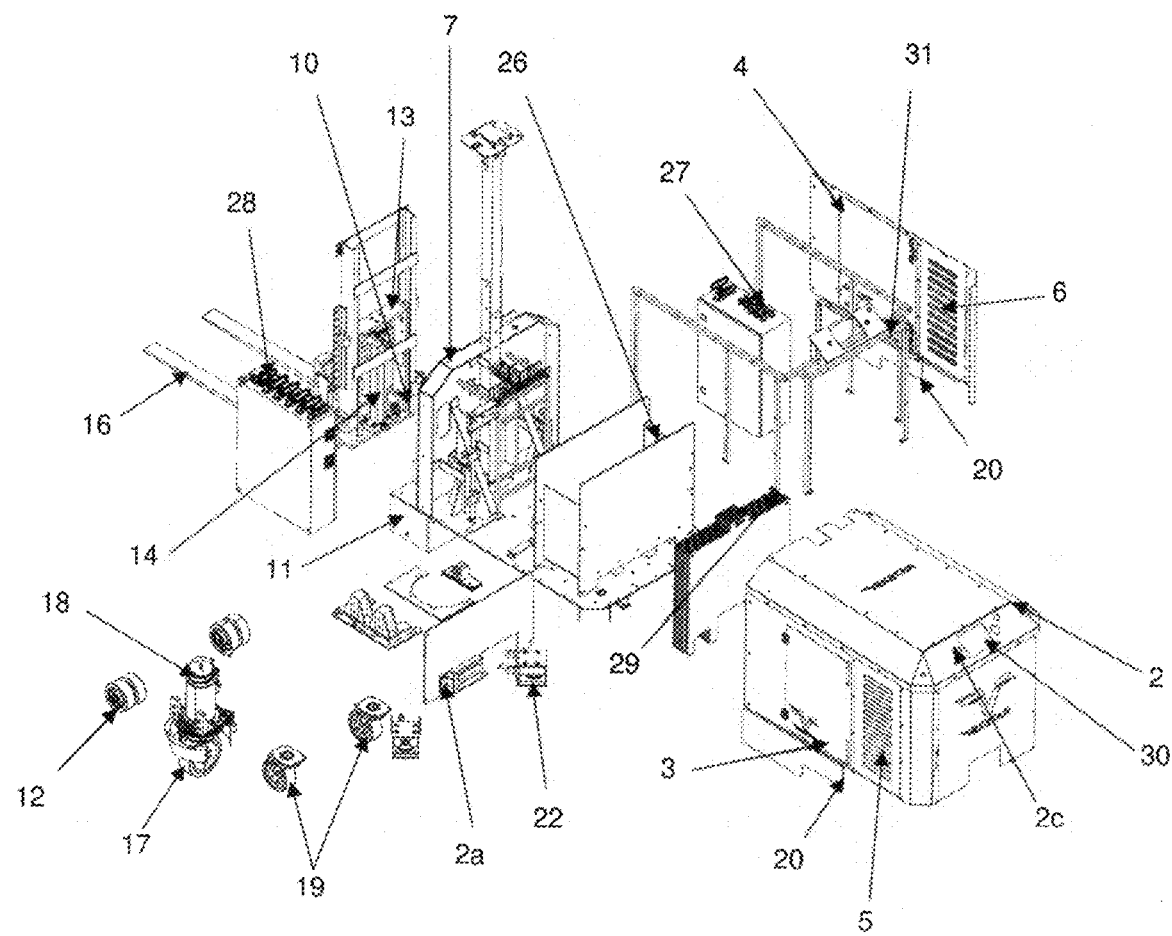
FIG. 2 is an exploded view of the AGV lift truck vehicle of the present invention.

Furthermore, there is a louvre type hatch (5, 6) upon the sides of the protective casing (2), immediately behind the respective side doors (3, 4), for the purpose of introducing or withdrawing the battery box (26), shown in FIG. 2. The louvre type hatches (5, 6) permit dissipation of the heat emitted within the casing and, differing from the side doors (3, 4), which have a simple opening system, these may only be removed when the perimetrical safety bolts securing them are removed.

The front part of the chassis constituting the lift truck vehicle (1) presents a compartment (7) formed by two plates and a cold rolled frame of sufficient strength for the purpose of the attachment of the Banner tower (8), this in turn having attached at the free extremity thereof a base (92) for the purpose of the attachment of the navigation sensor. The compartment (7) is sufficiently strong to support the Banner tower, having all the accessories thereof installed, and to resist an impact by the mast (10), should this latter give way before the weight of a given load or through a collision.

Figure 5A:
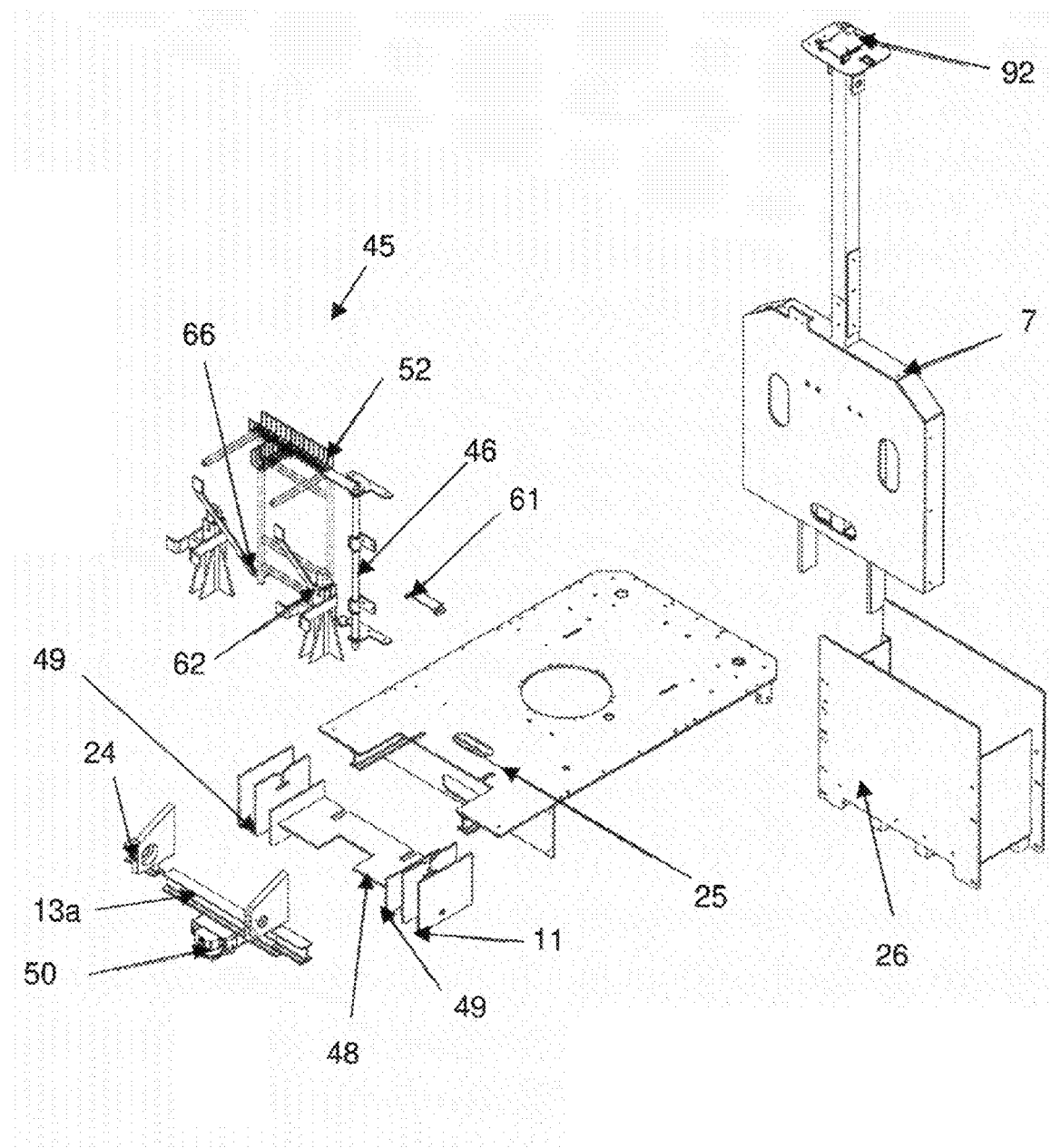
FIG. 5a is an exploded view of the principal components mounted upon the chassis of the AGV lift truck vehicle of the present invention.

With reference to the mast (10), it is supported upon a reinforced base (11) resting upon the plate of the chassis (described in FIG. 5a). The reinforced base (11), in turn, is supported upon the ground by means of two sets of fixed double wheels (12) contributing to the displacement of the lift truck vehicle. The mast (10) furthermore serves as support and guide for the lifting carriage (13), the fork hanger frame (15) and the forks (16), whilst a lifting cylinder (14) is positioned upon the support plate (68) constituting the mast (10).

One driving and steered wheel (17) is coupled to an electric motor (18) in order to displace and steer the lift truck vehicle. The wheel (17) and electric motor (18) assembly is strategically located in a central position under the chassis of the lift truck vehicle, given that by positioning the motor in the centre there is a shorter distance between the battery box and the electric motor and, furthermore, as this position achieve the placement of more weight upon the rear wheels, more traction and control is generated when braking. A greater weight upon the rear wheels also assists in acceleration upon slippery surfaces, provides greater support for the brakes and contributes to preventing the front part of the lift truck rising when a given weight is being loaded.

A further benefit from the location of the electric motor is the space rendered available upon the chassis covered by the casing by virtue of the fact that it leaves space free for the implementation of other accessories, such as power board, the control board, the battery box, the counterweight, the casing reinforcement frame, etc. In fact, by placing more weight upon the rear part of the lift truck vehicle, the rear wheels can absorb the force resulting from frontal impacts with greater facility.

The rear wheels (19), differing from the front wheels (22), present free movement and are located at the rear extremity of the chassis of the lift truck vehicle (1), permitting them to move in the direction of the driving and steered wheel (17) by virtue of the fact that they orient in the direction of this latter when the vehicle moves in a straight line or they rotate in the corresponding sense when the vehicle is turning.

A flanking cover (20) encloses three quarters of the length of the chassis of the lift truck vehicle (1) in order to prevent the introduction of objects beneath the same which may obstruct the driving wheel (17) during the displacement of the vehicle.

Displacement of the lift truck vehicle of the present invention is guided automatically by means of routes programmed for the movement of goods within warehouses and production lines; for this purpose the lift truck vehicle described makes use of navigation sensors (21) and safety devices, such as safety laser scanners (22), which in conjunction with references installed in the warehouses or production lines comply with the industrial and machinery safety regulations of the country wherein they are marketed, by virtue of the high degree of interaction thereof with the personnel of the warehouses or production line.

An additional safety accessory is an angular position sensor (23) mounted upon a machined part (24) at each extremity of the piston support beam (13a). By means of the assistance of the angular position sensor (23) the rear part of the lift truck (1) can be prevented from raising when it is supporting a given load, this representing the greatest number of accidents through the use of lift trucks in the present day. The angular position sensor (23) measures the inclination of the lift truck recorded during the manoeuvre in order to determine whether it lies within a preestablished safety range such that, should the range of inclination be exceeded, an acoustic and visual warning signal will be emitted, notifying the error and stopping the movement of the lifting carriage (13).

In the lower part of the rear part of the casing (2) there is the self-charging port (2a) for feeding the batteries (not shown) located within the battery box (26). Upon the casing (2) there is also located the female connector (2b) for connecting the manual remote control (not shown) together with an emergency stop button (2c). In FIG. 1a there is clearly shown the navigation sensor (21), the strobe light (54) and a Moxa access point (55a) these being located in the upper part of the Banner tower (8).

In FIG. 2 there is provided an exploded view of the lift truck vehicle (1) of the present invention wherein there is a cold rolled base plate (25) whereupon there is placed the compartment (7) which, in turn, serves as support for the Banner tower located upon the perimetrical frame (43) thereof.

As mentioned in foregoing paragraphs, a casing (2) covers in a removable manner the total length of the base plate (25), from the rear extremity thereof as far as the internal face of the compartment (7) having the purpose of protecting the internal components of the proposed lift truck vehicle (1). At the opposite extremity from the compartment (7), upon the base plate, there is located the battery box (26) which, in the preferred embodiment, has wheels such that it may be easily installed or withdrawn through the louvre type hatches (5, 6) of the casing (2). The battery box stores the electrical energy required for the operation of the driving wheel (17), of the user interface (30), and of all the electrical devices of the lift truck vehicle. For their part, the side doors (3, 4) give access to the power board (28) and to the control board (27), respectively.

As may be observed in FIG. 2, a counterweight (29), constituted by a series of metal plates joined to one another, is located at the rear extremity of the base plate (25), immediately behind the battery box (26), for the purpose of counteracting the weight of the load lifted. Furthermore, there is a reinforcing skeleton (31) formed from box section RHS tubes in order to support the weight of the casing (2) and prevent the internal components from being damaged should an object fall thereupon.

With respect to the user interface (30), the user views it by means of an aperture in the casing (2), however it is maintained supported upon a plate welded upon the reinforcing skeleton (31) by means of a frame (32), having the objective that the lift truck vehicle (1) may be utilised without the casing (2) should there be a requirement for maintenance to the internal components thereof or repair activities.

Figure 3:
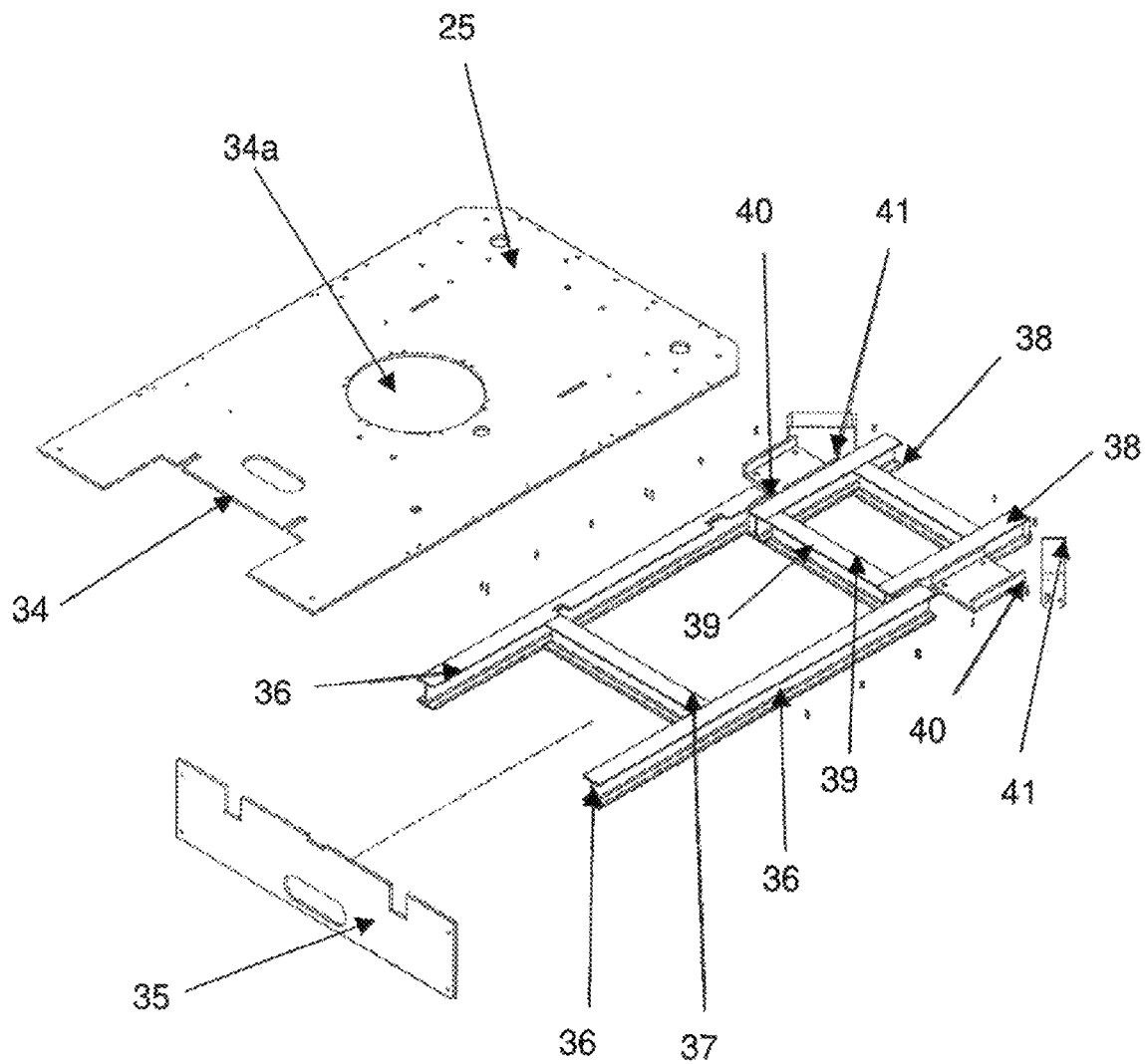
FIG. 3 is an exploded view of the components of the chassis constituting the base of the AGV lift truck vehicle of the present invention.

As illustrated in FIG. 3, the base plate (25) constituting part of the chassis is joined to a reinforcing structure (33) formed by joining "I" type beams, by virtue of the fact that they permit flexibility and support the entire structure. The base plate (25) is constituted by a cold rolled plate presenting a rectangular cut-out (34) in the front extremity thereof having the purpose of attaching a support plate of the reinforced base (11) (described below). A central circular opening (34a) permits the passage of the electric motor coupled to the driving and steered wheel (17). Once the base plate (25) has been joined to the reinforcing structure (33) a second blocking front plate (35) is welded in a perpendicular manner to the rectangular cut-out (34) of the base plate (25), between the two longitudinal beams (36) and parallel to the joining beam (37) constituting the reinforcing structure (33).

Upon the rear extremity of the longitudinal beams (36) there is furthermore a second structure of "I" beams formed by two short longitudinal beams (30) joined by means of two internal beams (39) constituting a frame for the attachment of two support plates (40) for the installation of the free wheels (19), and two angled frames (41) for the installation of the safety laser scanners (22).

Figure 4:
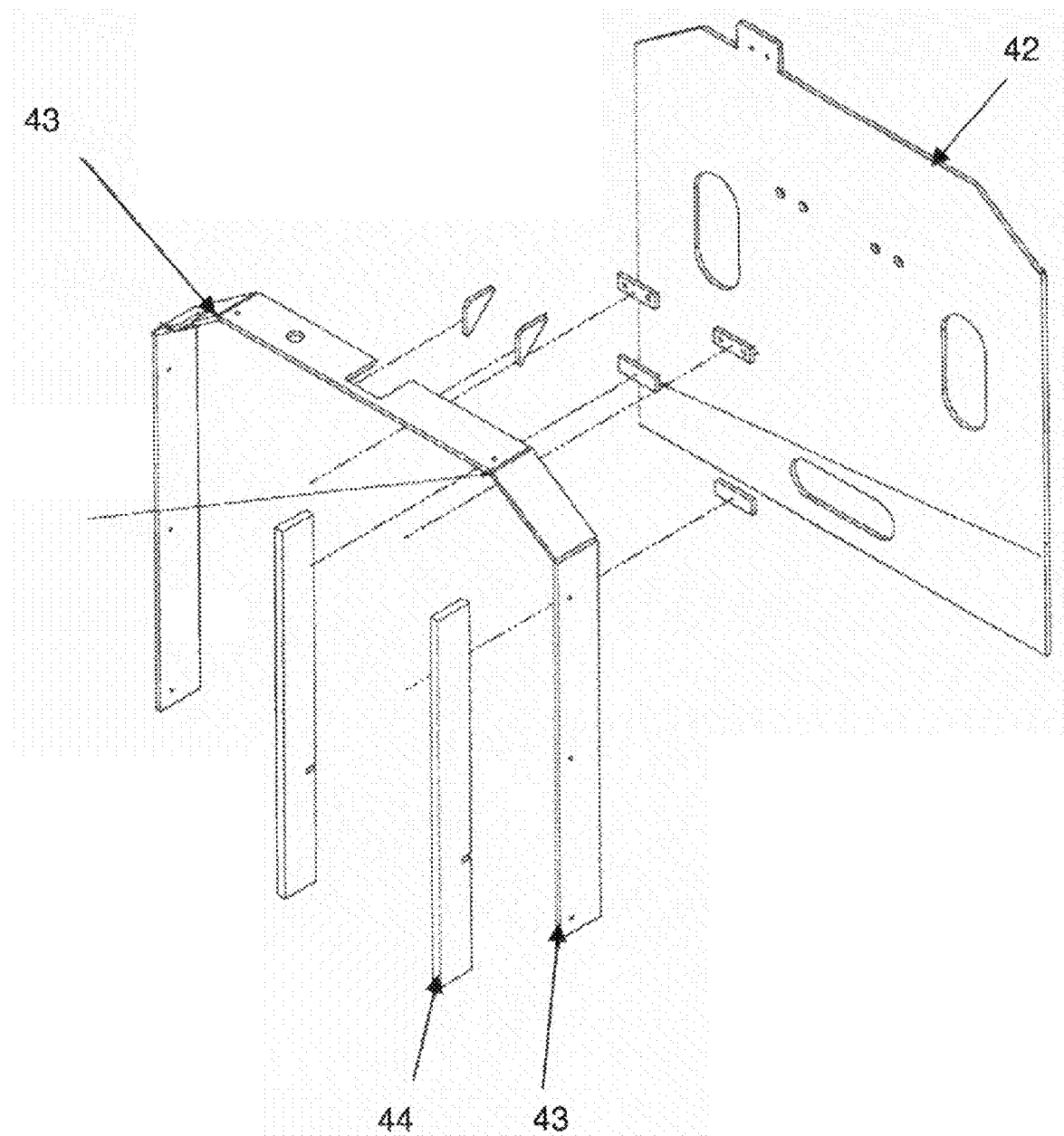
FIG. 4 is an exploded view of the housing supporting the Banner tower of the AGV lift truck vehicle of the present invention.

As has been described in foregoing paragraphs, the compartment (7) is a reinforced component by virtue of the fact that it is located at the front extremity of the lift truck (1) at a point close to the lifting device, it consequently being constituted by two cold rolled plates (42) joined by means of a perimetrical central frame (43) which, in turn, is reinforced by internal parallel plates (44), this providing greater strength to the structure of the compartment (7) and permitting attachment of the Banner tower (8) upon the very frame thereof (43), as shown in FIG. 4.

Figure 5B:
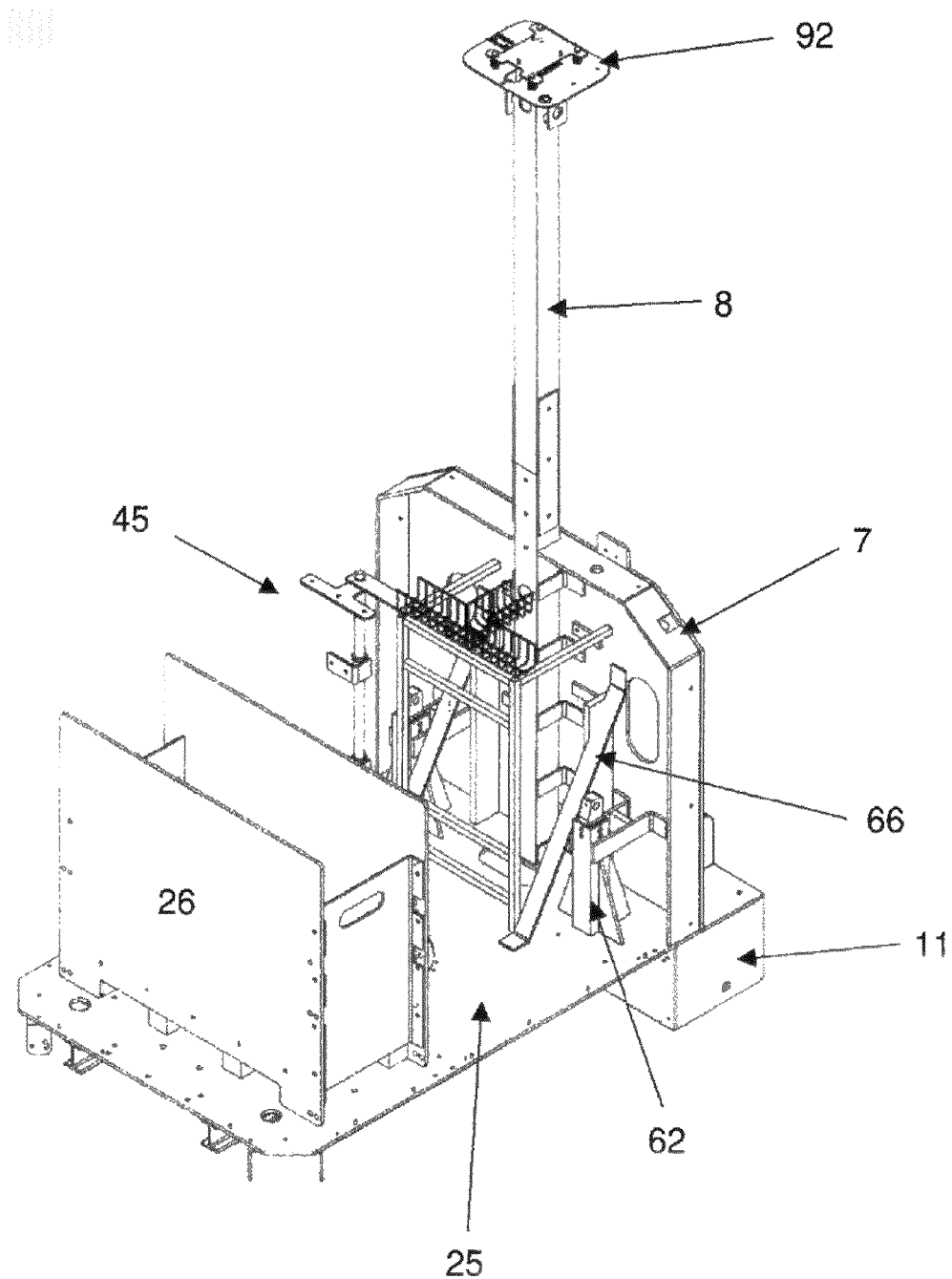
FIG. 5b refers to the fully assembled components of FIG. 5a which form the chassis of the AGV lift truck vehicle of the present invention.

In FIGS. 5a and 5b there is shown the internal reinforcing structure (45) supporting the compartment (7) upon the front extremity of the base plate (25). The internal reinforcing structure (45) in addition to supporting the compartment (7) safely maintains the power board (28) upon the base plate (25) by means of the attachment bar (46). Returning to the base plate (25), upon the longitudinal beams (36) of the reinforcing structure (33) there is inserted the reinforced base (11) constituted by a horizontal plate (48) and three perpendicular plates (49) at each extremity, which same, in turn, are spaced one from another in order to form two housings (upon each side) for the installation of the two sets of double wheels (12) supporting the front structure of the lift truck vehicle (1). These wheels, differing from the rear free wheels (19), are fixed by virtue of the fact that they support the entire weight of the load supported upon the forks, such that the axis of rotation thereof is parallel to the load axis of the lifting device. Furthermore, the side plates (49) cover the entirety of the upper, front and rear extremities of the fixed wheels (12) in order to prevent objects being introduced which might obstruct them during the advance of the lift truck vehicle (1).

In terms of the horizontal plate (48), this latter is designed to hold the piston support beam (13a) whereupon is supported the mast (10) which, in turn, has at each extremity the machined parts (24) for the installation of the angular position sensors (23).

In addition to the angular position sensors (23) the lift truck vehicle of the present invention utilises a navigation sensor (21) continually calculating by estimation the position, orientation and speed (direction and rapidity of movement) of the lift truck vehicle (1) without the need for external references, and a proximity sensor (50) mounted below the piston support beam (13a) within a safety clamp, for the purpose of detecting possible objects in front of the lift truck (1). This proximity sensor (50) is an essential safety tool by virtue of the fact that on being an automatic vehicle it must be capable of becoming aware of the presence of unexpected objects or persons crossing in front of it.

Figure 6:
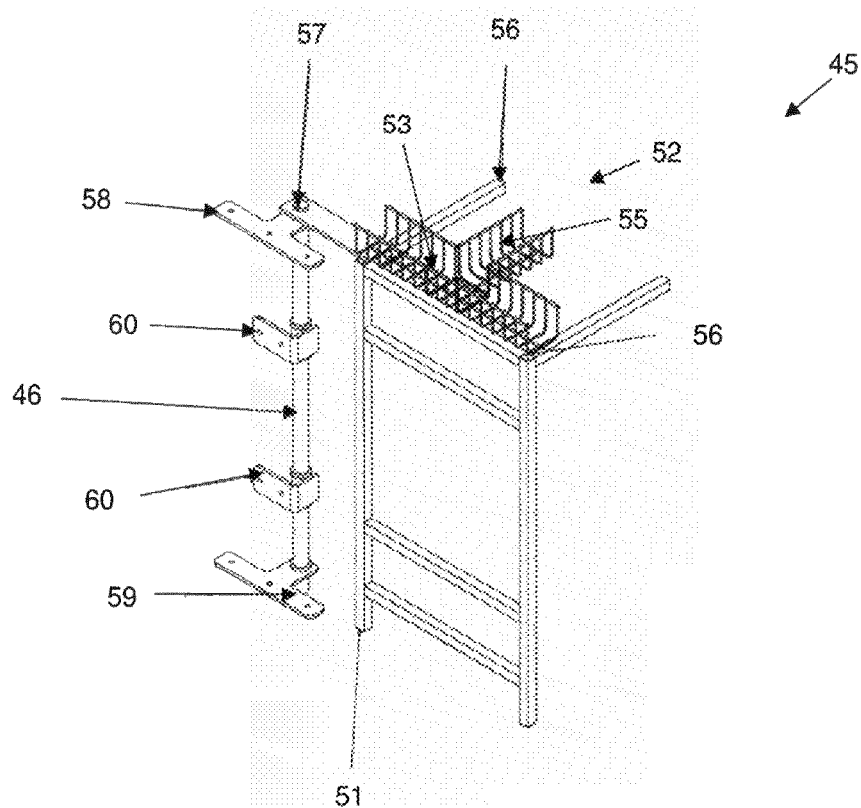
FIG. 6 is a detailed view of the internal reinforcing structure supporting the housing upon the base of the chassis of the AGV lift truck vehicle of the present invention.

Referring to FIG. 6, therein may be observed in detail the internal reinforcing structure (45) formed from a tubular box frame (51) of RHS having two vertical longitudinal beams and at least four horizontal joining tubes. The upper part of the internal reinforcing structure (45) presents a duct (52), in the form of a "T", for the passage and housing of the connecting cables between the power board (28) and the control board (27) by means of trough (53), and within the Banner tower (8) towards the navigation sensor (21), strobe light (54), and a Moxa access point (55a) by means of trough (55).

Two short longitudinal beams (56) of box section tubing of RHS material permit supporting the internal reinforcing structure (45) of the compartment (7), as shown in FIG. 5b, leaving a sufficient distance such as to not damage the ducting (52). At the left extremity of the upper horizontal tube constituting the internal reinforcing structure (45) there is located an extension piece (57) of plate holding the attachment bar (46), by means of the upper extremity thereof, which supports the power board (28), for which purpose it utilises an upper and lower plate (58, 59) having perforations for the purpose of bolting onto the extremities of the power board (28), together with two plates at an angle of 90° (60) reinforcing such holding. It must be noted that the plates (58, 59) are not located at the same level as the extremities of the attachment bar (46), by virtue of the fact that it engages by means of the upper extremity thereof in a perforation in the upper plate (58) and by means of the lower extremity thereof it passes through the lower plate (59) such as to maintain the power board (20) distanced from the upper surface of the base plate (25), having the purpose of preventing short circuits or of it becoming wet should water penetrate towards the interior of the casing (2). By virtue of the fact that the power board (28) is maintained suspended between the plates (58, 59), the free extremity of the power board (28) rests upon the support (61), shown in FIG. 5a and located upon the surface of the base plate (25), in order to stabilise it.

Figure 7:
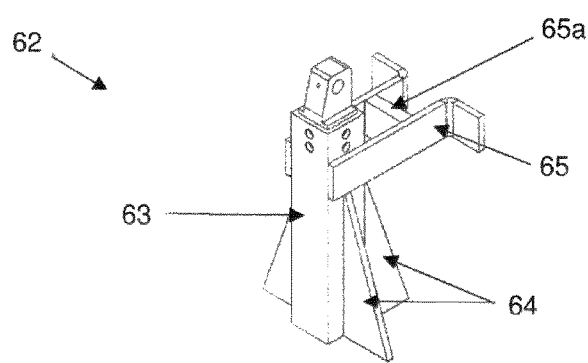
FIG. 7 is a detailed view of the reinforcing towers supporting the housing upon the surface of the chassis of the AGV lift truck vehicle of the present invention.

For the purpose of affixing the internal reinforcing structure (45) to the base plate (25) there are employed two reinforcing towers (62), shown in FIG. 7, formed from a portion of box section tubing (63) having at least three support gussets (64) upon the faces of each portion of box section tubing (63), permitting them to be firmly seated upon the surface plate (25). The reinforcing towers (62) stabilise the compartment (7) by means of two 90° plates (65) joined to one another by means of a length of plate (65a). A pair of struts (66), shown in FIGS. 5a and 5b, are welded at one extremity to the compartment (7) and at the opposite extremity thereof to the base plate (5) in order to maintain the compartment firmly joined as an assembly with the reinforcing towers (62) and the internal reinforcing structure (45).

Figure 8A:
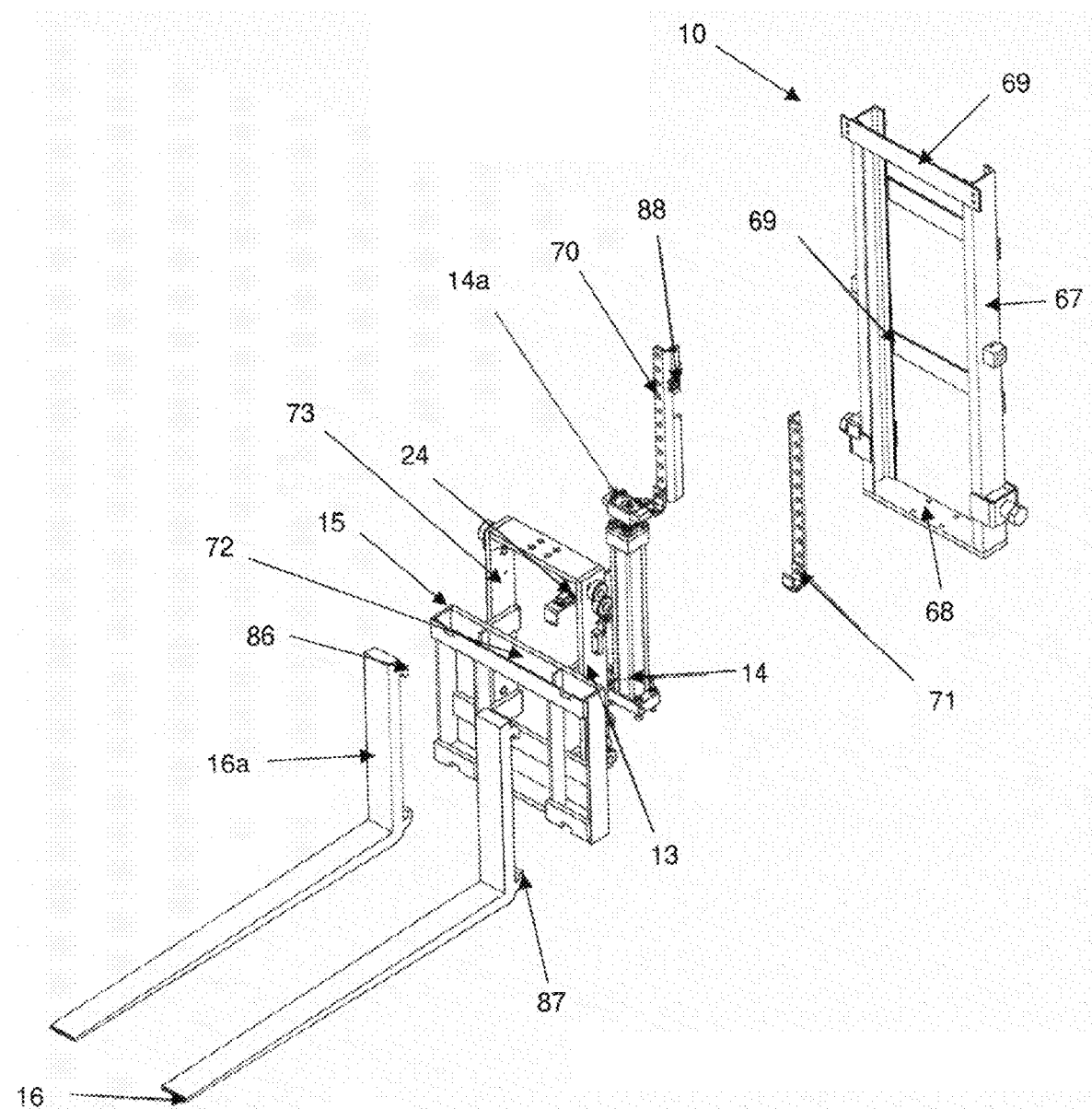
FIG. 8a is an exploded view of the lifting system of the AGV lift truck vehicle of the present invention.
Figure 8B:
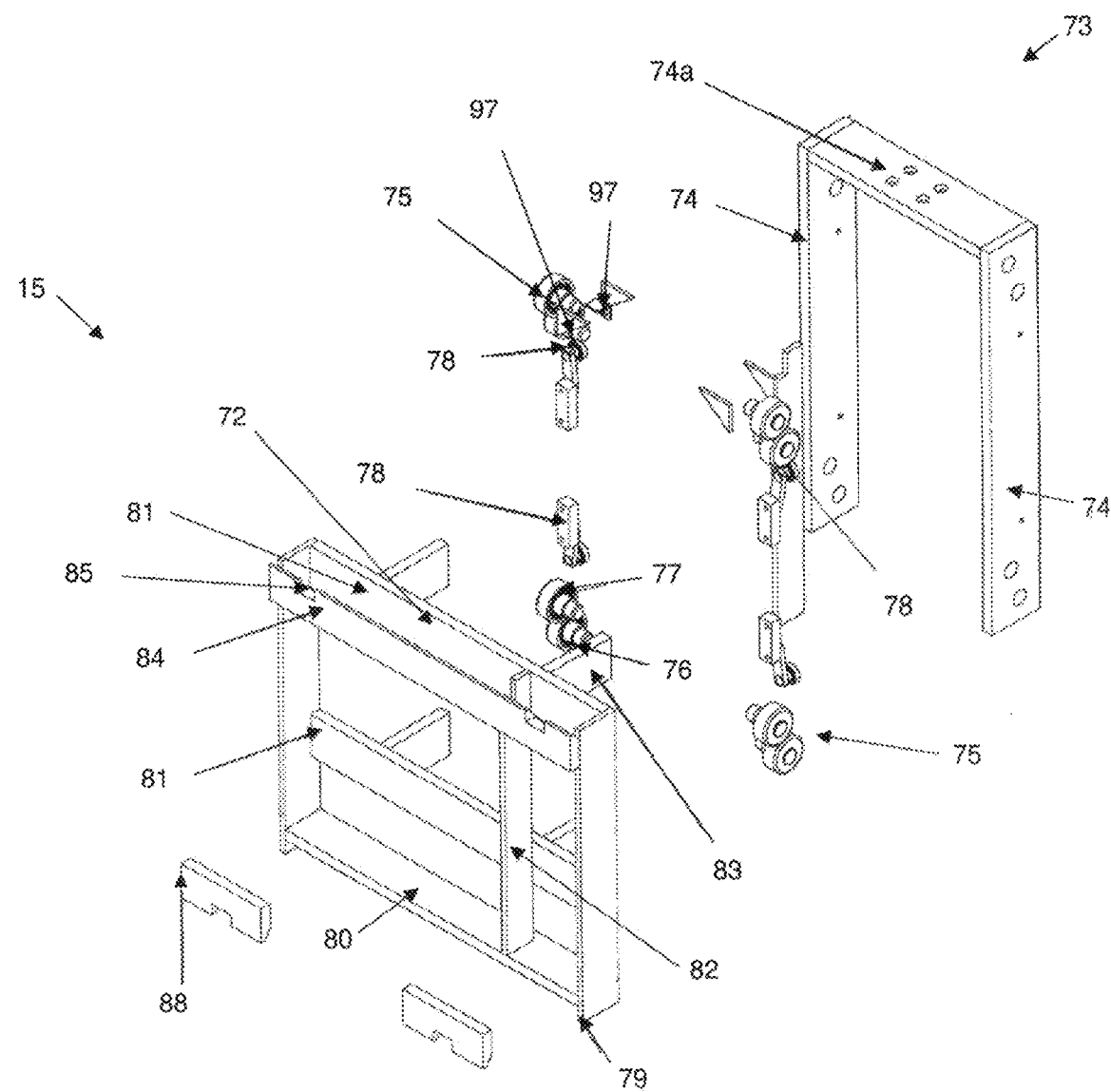
FIG. 8b is an exploded view of the fork hanger mechanism and lifting carriage forming the lifting system of the AGV lift truck vehicle of the present invention.
Figure 8C:
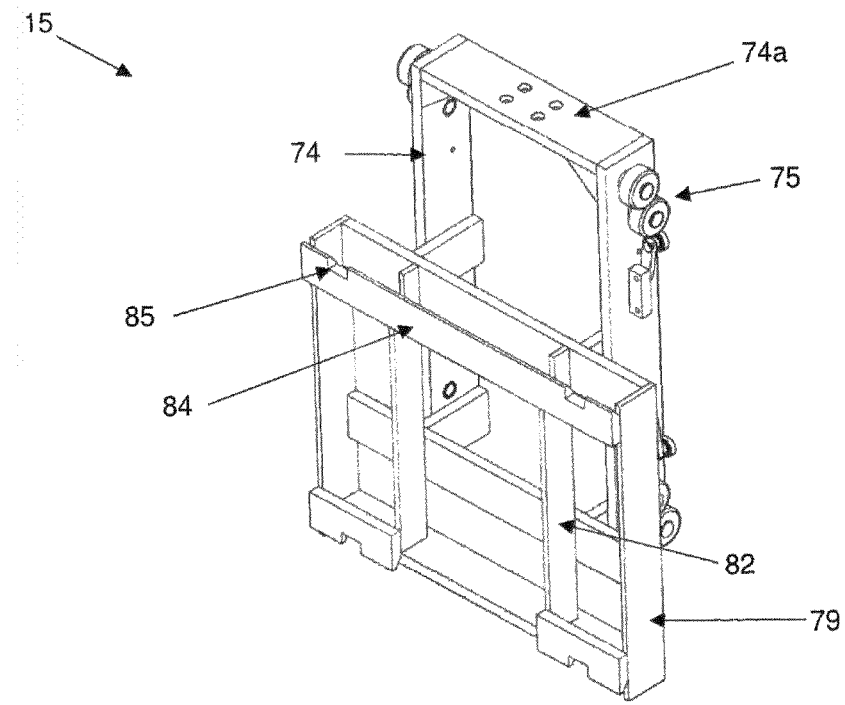
FIG. 8c refers to the fully assembled components shown in FIG. 8b to form the lifting system of the AGV lift truck vehicle of the present invention.

Making reference now to FIGS. 8a, 8b and 8c, therein is shown the lifting device comprising a mast (10) formed by two "C" type vertical beams (67) joined by means of a support plate (68) serving to attach the mast (10) to the horizontal plate (48) of the reinforced base (11) which forms part of the base plate (25) of the lift truck vehicle (1). Three plates (69) distributed between the "C" type beams (67) are employed as reinforcement of the mast (10).

Upon the edge of the vertical beams (67) of the mast (10) there are positioned safety supports (70) having a series of perforations (71) for the adjustment thereof to different heights upon the edges of the beams (67) by means of bolts. Two hooks (71) at the lower extremity of the safety supports (70) subject the upper frame (72) of the fork carriage (15) should the load supported exceed the limit of strength of the lifting cylinder (14).

Figure 9:
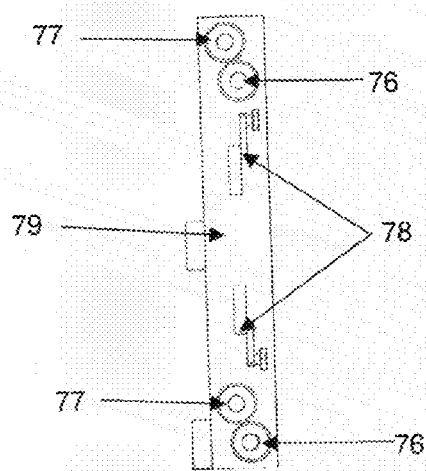
FIG. 9 is a side view of the means of displacement of the lifting carriage and fork hanger of the AGV lift truck vehicle of the present invention.

The lifting carriage (13) is constituted by a rectangular frame (73) having attached upon each exterior face of the vertical sides thereof (74) two sets of angularly displaced wheels (75) facilitating the displacement thereof when it is fitted within the channels defined by the two "C" type vertical beams (67) of the mast (10). In this respect, FIG. 9 shows the position of the wheels (75) permitting that the rear wheels (76) run within the rear part of the "C" type vertical beams (67) whilst the front wheels (77) run within the front part of the "C" type vertical beams (67), consequently stabilising the lifting carriage (13) within the mast (10) in order to prevent ruptures which might occur by virtue of misalignment of the lifting carriage (13) during the displacement thereof on lifting a given load. Two sets of bearings (78) upon each exterior face of the vertical sides (74) contribute to maintaining the lifting carriage (13) stabilised during the displacement thereof, the bearings (78) being located in a perpendicular sense with respect to the internal faces of the "C" type vertical beams (67).

To complete the lifting device there is configured a fork hanger frame (15) constituted on the basis of a rectangular plate frame having two vertical plates (79) joined at the lower extremity thereof by a horizontal perpendicular plate (80) and two horizontal perpendicular plates (81) of treated steel. A pair of internal vertical plates (82) reinforce the horizontal plates (81) by virtue of the fact that the each of the latter support two attachment plates (83) welded to the internal faces of the vertical sides (74) forming the lifting carriage (13). A front plate (84) of treated steel is welded to the plates (79) upon each plate (82) to support the forks (16) of the lift truck upon a pair of notches (85) formed in the front plate (84) by means of two extremities in hook form (86) in the load backrest (16a) of the forks (16). Furthermore, in the lower part of the load backrest (16a) there is defined an extremity in hook form (87) which are attached to two pieces (88) of treated steel welded to the horizontal perpendicular plate (80) of the fork hanger frame (15).

As aforestated, the safety supports (70) may be adjusted to different heights upon the edges of the vertical beams (67) of the mast (10), however, in addition, they present a perimetrical flange (88), shown in FIG. 8a, assisting in maintaining the set of wheels (75) within the vertical beams (67) and serving as a means of retention should they depart from the track thereof.

Referring to the lifting cylinder (14), this is located upon the support plate (68) of the mast (10) by means of four bolts whilst the thrusting extremity (14a) of the lifting cylinder (14) is bolted to the internal face of the horizontal plate (74a) maintaining joined the vertical sides (74) of the lifting carriage (13) which, in turn, surrounds the lifting cylinder (14) when it is located within the mast (10).

With respect to FIGS. 10a and 10b, therein is shown the Banner tower (8), being a structure of box section tubing of RHS material having within the interior a series of reinforcing parts (89) located by means of flood weld in the orifices presented by the RHS such as to leave solely the second orifice to affix the upper part thereof. The series of reinforcing parts (89) covers the join area in contact with the compartment (7) in order to strengthen the structure thereof, in such manner that the lower portion of the Banner tower (8) is affixed to the wall of the compartment (7) by means of a series of clamps (90). The lower portion of the Banner tower (8) presents an orifice (91) which abuts the trough (55) defined by the ducting (52), shown in FIG. 6, for the passage of the connecting cables which run from the control board (27) and from the power board (28) toward the navigation sensor (21), the strobe light (54) and the Moxa access point (55a).

For the attachment of the navigation sensor (21), the strobe light (54) and the Moxa access point (55a), there is employed a base (92) affixed to the upper extremity of the Banner tower (8) by means of two clamps. The base (92) furthermore forms an access port between the navigation sensor (21), the strobe light (54) and the Moxa access point (55a) and the interior of the Banner tower (8) for the passage of the connecting cables.

Figure 11A:
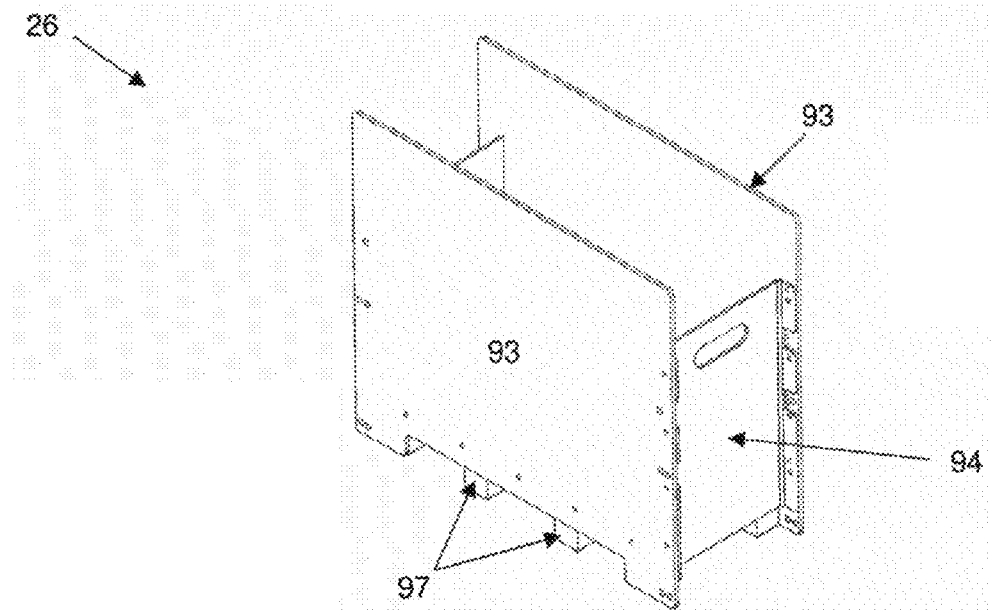
FIG. 11a is a perspective view of the battery box of the AGV lift truck vehicle of the present invention.
Figure 11B:
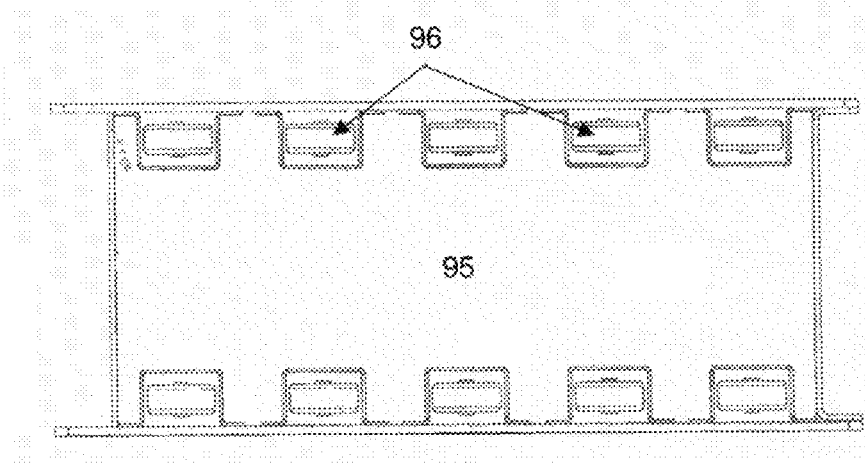
FIG. 11b is an underneath view of the battery box of the AGV lift truck vehicle of the present invention.
Figure 12:
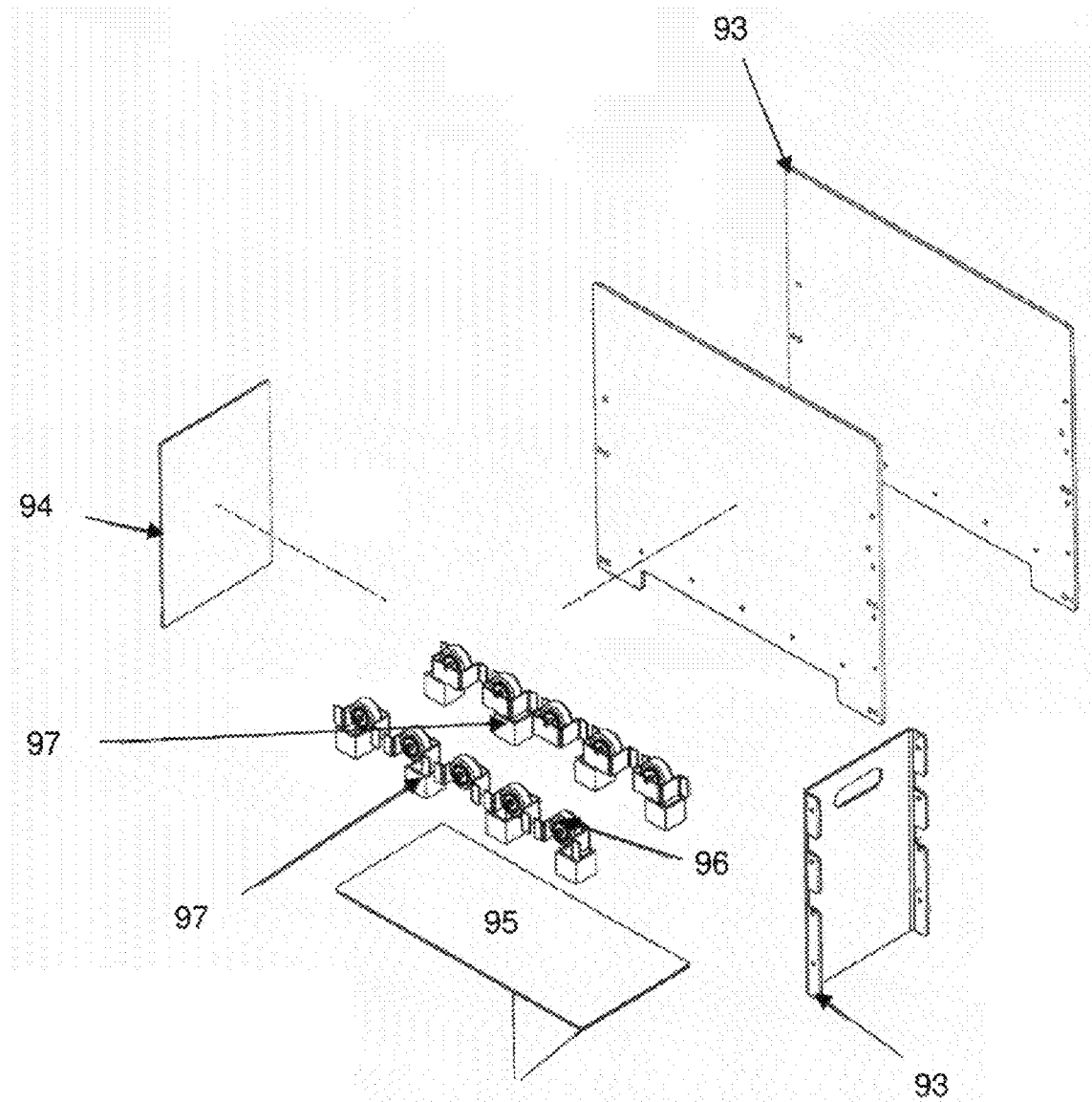
FIG. 12 is an exploded view of the battery box of the AGV lift truck vehicle of the present invention.

In FIGS. 11a and 11b there is shown the battery box, the same being formed by two side plates (93) having a cut-out in the lower part (94) and two joining plates (94) having handgrips allowing the battery box (26) to be lifted or pulled for the purpose of introducing it into or withdrawing it from the casing (2). Furthermore, in order to facilitate the displacement thereof, the battery box presents a base (95) having a series of perimetrical cut-outs permitting the free passage of the wheels (96) for the displacement thereof. The wheels (96) are mounted upon a drive train, shown in FIG. 12, permitting them to contract within the battery box (26) for the purpose then being held supported upon a plurality of seats (97) when it is placed upon the base plate (25) forming the chassis of the lift truck vehicle (1). When it is desired to withdraw the battery box (26) from the casing (2), the two louvre type hatches (5, 6) are removed and the wheels (96), which exceed the height of the seats (97), are released for the purpose of being able to move the battery box with greater facility.

Figure 13:
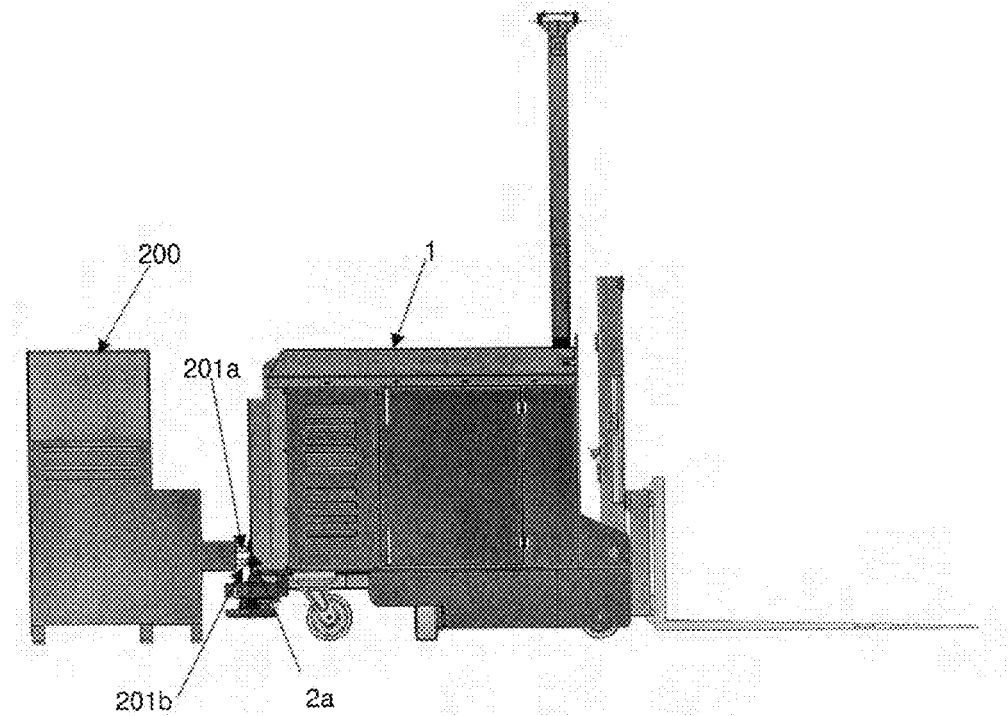
FIG. 13 is a side view of the AGV lift truck vehicle of the present invention connected to a charging point.

In conformity with FIG. 13, in periods of inactivity or preestablished charging periods the automatic guided vehicle (1) travels to a charger (200) located at a site having coordinates preestablished in the control logic thereof such that, when the vehicle is in a state of inoperativeness, the latter travels and connects in an automatic manner to a charging contact port (201) of a charger (200) by means of the self-charging port (2a) thereof with the charging contact port (201) of the charger (200).

Figure 14:
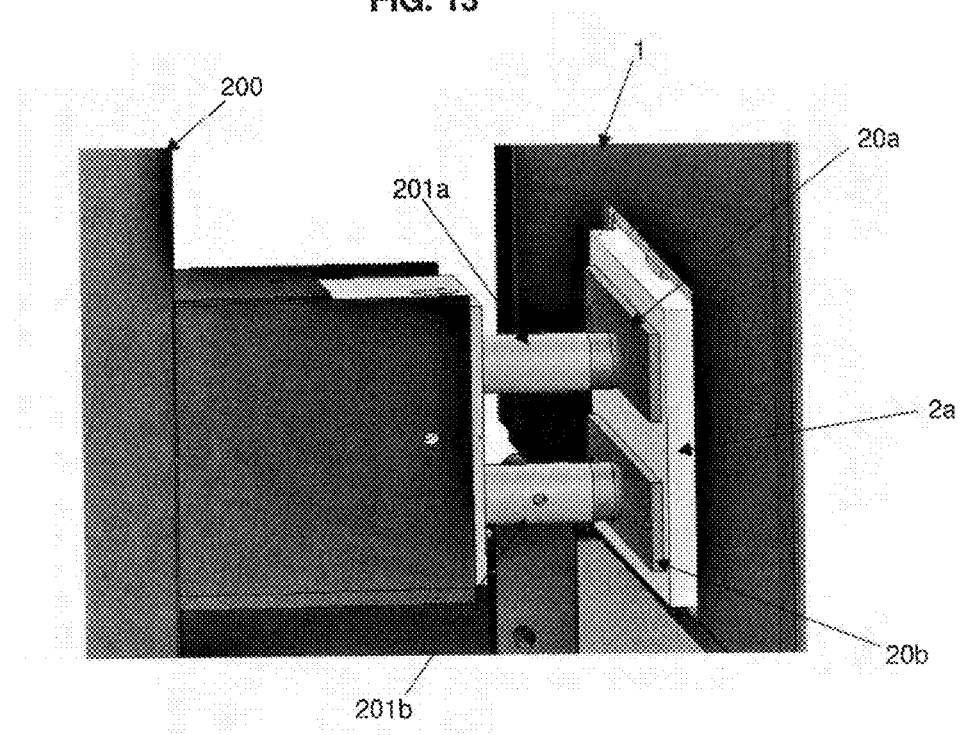
FIG. 14 is a close up view of the charging contact port of the AGV lift truck vehicle of the present invention.

Referring to FIG. 14, the charging contact port (201) of the charger (200) comprises a pair of contact pistons (201a, 201b) carrying a voltage of 220 V or 440 V, a current of 250 A and a frequency of 60 Hz towards the self-charging port (2a) of the vehicle (1), wherein a first contact member (201a) connects to a first conductive surface (20a) and a second contact member (201b) connects to a second conductive surface (20b) of the self-charging port (2a). In this manner, the supply voltage provided by the charger (200) is carried towards the vehicle (1) in order to charge the bank of batteries thereof (not shown).

Figure 15:
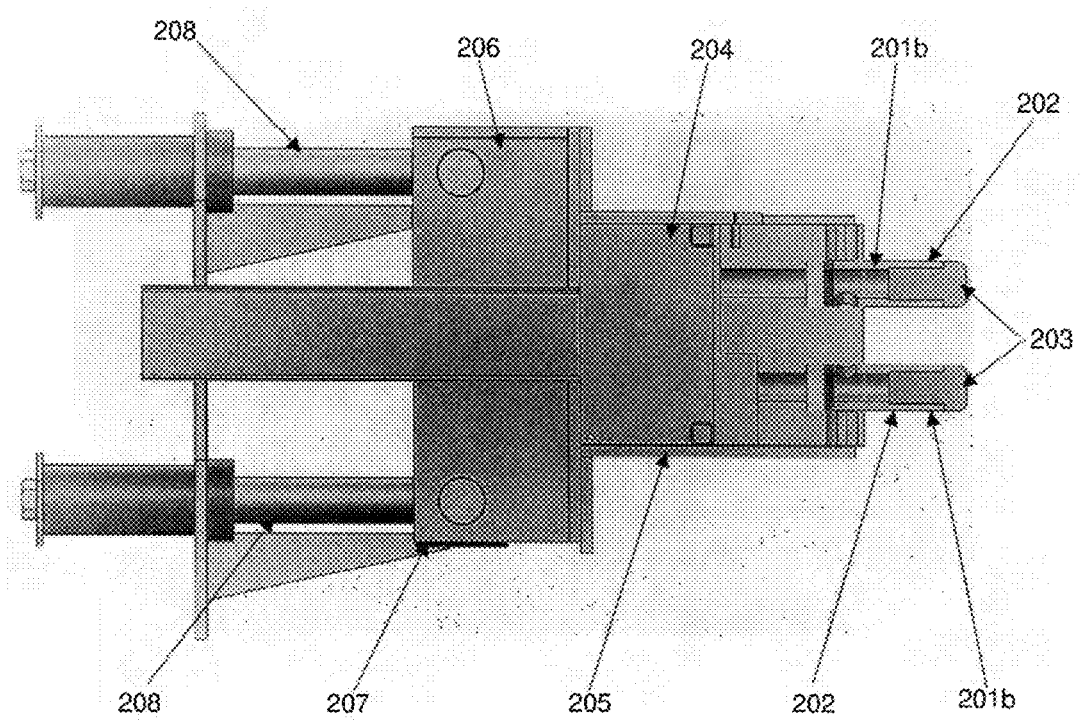
FIG. 15 is an underneath view of the first and second contact points of the charging contact port of the AGV lift truck vehicle of the present invention.

Furthermore, each of the first and second contact members (201a, 201b) of the charging contact port (201) of FIG. 15 consist of a cylinder (202) of non-conductive material and a conductive cap (203) provided at the extremity of each cylinder (202). The first and second contact members (201a, 201b) are mounted upon a first mechanical head (204) comprising a housing (205) having elements of mechanical correction such as at least one spring providing a backwards or forwards displacement of approximately 10 mm to the first and second contact members (201a, 201b) of the charging contact port (201).

Continuing with FIG. 15, the first mechanical head (204) is attached to a second mechanical head (206) comprising a base housing (207) mounted upon at least four cushioning elements (208) providing a forwards or backwards linear movement of approximately 60 mm to the charging contact port (201) of the charger (200).

Figure 16:
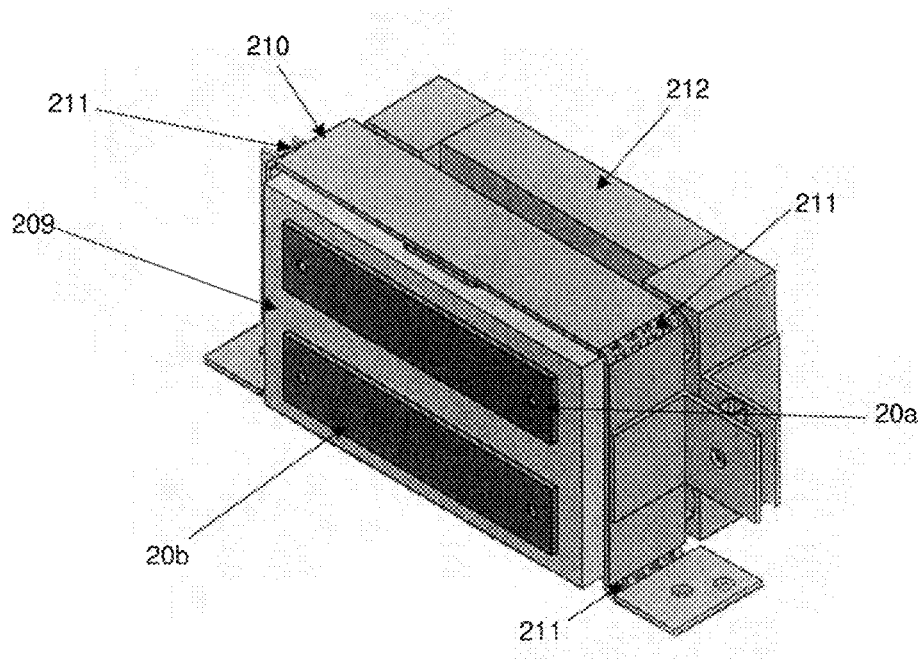
FIG. 16 is a front perspective view of the self-charging port of the AGV lift truck vehicle of the present invention.

With reference to FIG. 16, the self-charging port (2a) of the vehicle (1) consists of a first conductive surface (20a) and a second conductive surface mounted upon an element of non-conductive material housed within a casing (210).

The casing (210) is mechanically affixed by means of at least four sprung elements (211) upon a base casing (212). As a consequence thereof an angular mechanical correction is achieved upon the first and second conductive surfaces (20a, 20b) at the moment of achieving a connection between the first and second contact members (201a, 201b). This is possible by virtue of the movement realised in the centre of affixation thereof providing 10 degrees of rotational freedom opposed with sprung elements (211) which absorb the forces that the contact members of the charger exert upon the conductive surfaces (20a, 20b) of the self-charging port (2a) of the vehicle (1).

In such manner, and in conformity with FIG. 14, certain freedom is achieved in the electrical connection of the self-charging port (2a) of the vehicle (1) with respect to the charging contact port (201) of the charger (200). Consequently, it is not necessary that the automatic guided vehicle (1) be required to be positioned at an exact point in relation to the charger for the recharging of its bank of batteries.

Figure 17:
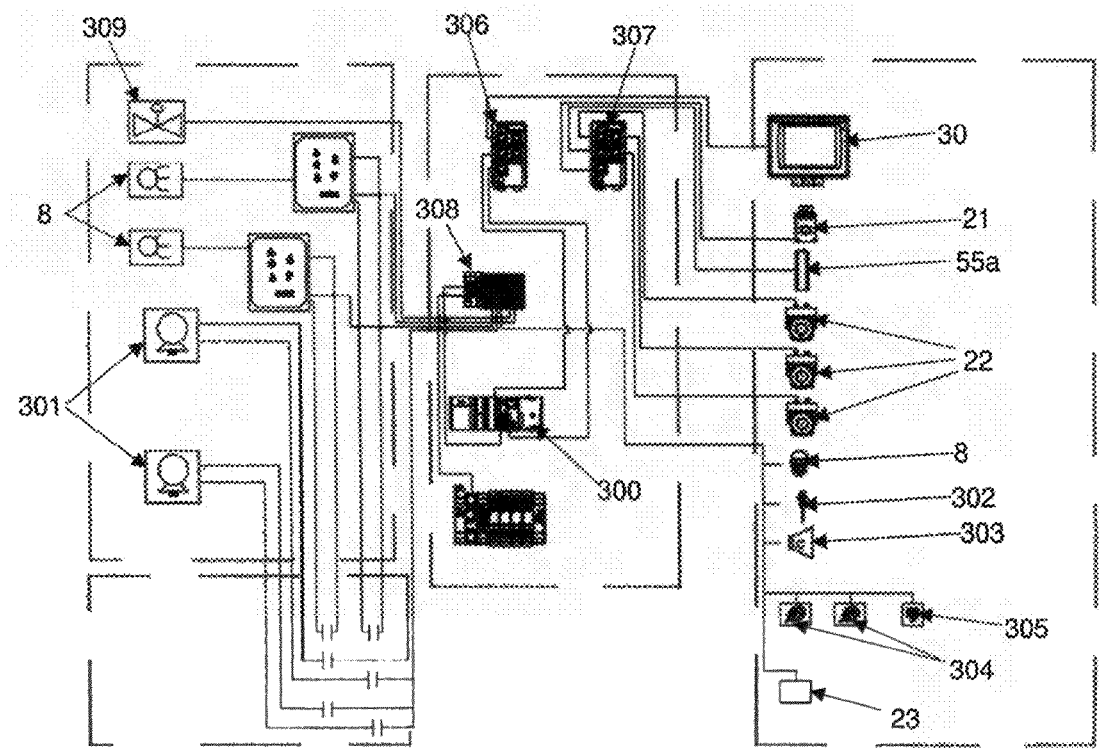
FIG. 17 is a diagram of the user interface of the AGV lift truck vehicle of the present invention.

In conformity with FIG. 17, the automatic guided vehicle (1) comprises a user interface (30) displaying a graphical interface by means whereof there are established parameters of control and function of the vehicle established previously in the control logic of a programmable logic controller (300). According to the preferred embodiment of the invention, the user interface is a touch screen.

In a constant manner and in real time a navigation sensor (21) sends signals to the PLC (300) containing information data in relation to the position of the vehicle, whilst the Moxa access point (55a) receives from and sends to the PLC (300) information signals with respect to the data of tasks and programmed routes which the vehicle (1) must execute. As a consequence, the PLC processes the information and in conformity with the tasks established sends the corresponding control signals to at least one electric motor (18) to displace and direct the vehicle toward the location established. Furthermore, based upon the information data of the task, the controller determines the moment in relation to the operation of the lift truck of the vehicle (1) by means of control signals sent to a hydraulic pump which activates/deactivates the lifting cylinder of the front lifting system of the vehicle (1).

In addition, for the purpose of preventing collisions the automatic guided vehicle (1) possesses a safety system comprising three safety scanners (22) whereof two thereof are each one located at each front corner of the vehicle (1), each safety scanner (22) establishing a safety range of 4 metres together with a warning zone of 15 metres and offering detection through 270 degrees to detect bodies coming within range. In this manner the PLC (300) obtains the information recorded by the scanners (300) for the processing thereof. In this manner, by means of the information, the control logic of the vehicle, through processing together with the PLC, determines a precise trajectory preventing collisions or impacts with other bodies in conformity with the preestablished route.

Furthermore, an inductive proximity sensor (302) is connected to the PLC (300), as is an audible alarm (303) which activates the PLC should the safety system detect an obstacle during the trajectory of the vehicle (1). The activation of a Banner tower (8) is controlled by means of the PLC (300) during the functioning of the vehicle (1) providing a highly visible indication to notify the state of the operations of the vehicle. The angular position sensor (23) measures the inclination of the lift truck recorded during the manoeuvre such manner that the values measured are sent to the PLC (300) which processes the information in order to determine whether the values measured are maintained within a safety range preestablished in the control logic of the vehicle.

At least one safety encoder (304) provides information signals to the PLC (300) regarding the position, the angle and the revolutions in specific angular increments. Each angular increment has assigned an unequivocal coat pattern wherein the number of code patterns per revolution determines the resolution. Each code pattern constitutes an unequivocal reference and, consequently, an absolute position. Furthermore, a linear encoder (305) provides the PLC with the direct and continuous measurement of the space travelled through and the time of movement of the vehicle. In this manner the PLC, through the control logic thereof, realises the corresponding calculations in order to obtain variables such as the power and the mechanical work, the force or the speed, for the control of at least one electrical steering motor (18) in order to displace and direct the vehicle (1) towards the location established.

Continuing with FIG. 17, a first switch (306) activates the operation of the user interface (30) whilst a second switch (307) activates the operation of the navigation sensor (21), the Moxa access point (55a) together with the safety scanners (22).

Furthermore, a modular input output system (308) serves as means of electrical connection between the PLC (300) and the control relays of the at least one electric motor (8) and a relief valve (309).

Figure 18:
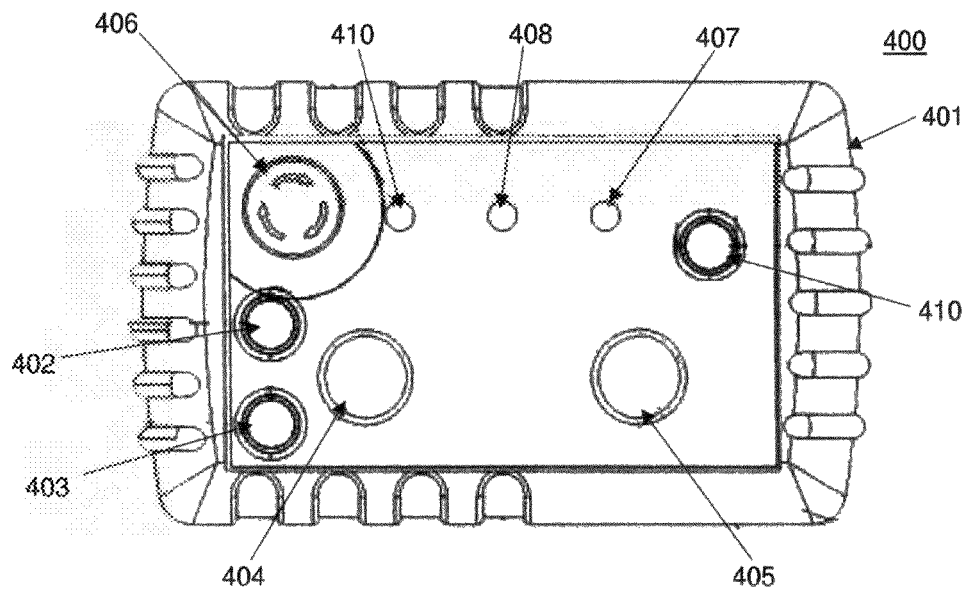
FIG. 18 is a front view of the manual remote control of the AGV lift truck vehicle of the present invention.

Referring to FIG. 18, which shows the manual remote control (400) comprising an electrical control board (not shown) housed within a control casing (401). The board comprises: a first pressure switch (402) commanding the increase in speed of the vehicle, a second pressure switch (403) commanding the reduction in speed of the vehicle, a first control lever (404) commanding the direction (left and right) of the vehicle together with the raising or lowering of the forks of the lift truck, a second control lever (405) commands the forwards or backwards movement of the vehicle together with the upward or downward tilt of the forks of the lift truck, an emergency stop button (406) deactivates the operation of the vehicle, and a bypass switch (410) activates/deactivates the safety systems of the vehicle.

Furthermore, a first indicator element (407) informs the user in a visual manner regarding the state of the forks of the lift truck, a second indicator element (408) informs the user in a visual manner regarding the state of the safety systems of the vehicle, and a third indicator element (409) informs in a visual manner the state of operation of the manual mode of the vehicle. Additionally, the control (400) comprises a cable whereof one of the extremities thereof is connected to the electronic control board and the opposite extremity comprises a male connector (not shown) which couples to the female connector (2b) of the vehicle (1) in conformity with FIG. 1a.

Although preferred embodiments have been shown and described, a person skilled in the art will be capable of modifying the same without departing from the scope or from the teachings of the present document. The embodiments described herein are solely examples and are not limitative.

Variations and modifications of the system are also possible, eliminating one or other of the processes described or adding a function to the system. All these variations lie within the scope of the invention.

For example, the navigation and safety devices, the type of materials utilised and the location of the equipments, such as the power board, the control board and the battery box, together with the doors and the devices located upon the Banner tower, and the control and safety equipments may be altered without the dimensions and configuration thereof being of importance. Consequently, the scope of protection is not limited to the embodiments described in the present document, it been solely limited by the claims which follow, the scope whereof shall include all the equivalents of the matter object of the claims.

The invention claimed is:

1. An automatic guided vehicle (AGV) having the capacity to move product in a safe manner from a point "A" to a point "B," the AGV comprising:
   a chassis formed by a metal structure, a base plate, and a reinforced base at a front end of the metal structure, wherein the chassis further comprises a compartment at the front end of the base plate for coupling a tower, a counterweight at a rear part of the base plate, and a battery box facing the counterweight;
   a protective casing comprising:
      two side doors for accessing a-power board and a control board, respectively; and
      two side hatches for introducing or withdrawing the battery box; and
      two flanking covers covering three quarters of a length of the chassis of the AGV;
   two sets of fixed wheels located at each end of the reinforced base;
   two freely moving wheels attached to two support plates at rear ends of the metal structure;
   a system of lifting mounted to the front of the metal structure, wherein the system of lifting comprises: a support mast, a lifting carriage, a lifting cylinder, a raising carriage, a fork hanger frame, and two front forks, wherein: the lift truck vehicle has a driving and steering wheel coupled to an electric motor, wherein the driving and steering wheel is positioned between the two freely moving wheels to displace and steer the AGV;
   a navigation and safety system comprising:
      security laser scanners attached to angled frames at the rear end of the metal structure;
      a navigation sensor upon an upper end of the tower to determine a position, an orientation, and a speed of the AGV;
      a proximity sensor upon a front part of the chassis to detect possible objects in front of the lift truck; and
      at least two angular positioning sensors upon the front part of the chassis for measuring changes in angular and linear position with respect to a reference position when a given load is being lifted; and
      a connector used for connecting a manual remote control to control the AGV in a manual mode.

2. The AGV according to claim 1, wherein the base plate presents a rectangular cut-out in the front end thereof for attachment of the reinforced base upon the rear end of the metal structure, a central circular opening, and a front blocking plate.

3. The AGV according to claim 1, further comprising a piston support beam comprising a machined part at each end for attachment of the at least two angular positioning sensors.

4. The AGV according to claim 1, further comprising a self-charging port.

5. The AGV lift truck according to claim 1, wherein the metal structure is formed by "I" shaped beams permitting flexibility and support of the metal structure.

6. The AGV according to claim 1, wherein the tower is of Banner type.

7. The AGV according to claim 6, further comprising a base at a free extremity of the Banner tower for the attachment of a navigation sensor, a strobe light, and a Moxa access point.

8. The AGV according to claim 1, further comprising a reinforcing skeleton formed by joining of box section RHS tubes for supporting a weight of the casing.

9. The AGV according to claim 1, further comprising a user interface.

10. The AGV according to claim 1, wherein the compartment is formed by two plates joined by a perimetrical central frame and at least two internal reinforcement plates.

11. The AGV according to claim 1, wherein the reinforced base comprises a horizontal plate comprising three perpendicular plates spaced at each extremity for installation of the two sets of fixed wheels.

12. The AGV according to claim 1, further comprising an internal reinforcing structure.

13. The AGV according to claim 12, wherein the internal reinforcing structure comprises an attachment bar comprising an upper plate and a lower plate.

14. The AGV according to claim 12, further comprising a duct in the form of a "T" in an upper part of the internal reinforcing structure.

15. The AGV according to claim 1, further comprising a support located upon a surface of the base plate for balancing the power board.

16. The AGV according to claim 1, further comprising two reinforcing towers formed by a portion of box section tubing and at least three gusset supports.

17. The AGV according to claim 1, wherein the mast is formed by two vertical "C" type beams joined by a support plate and three reinforcing plates distributed between the two vertical "C" type beams.

18. The AGV according to claim 1, further comprising two safety supports comprising a series of perforations for being adjusted to different heights.

19. The AGV according to claim 18, further comprising two hooks upon a lower end of the two safety supports.

20. The AGV according to claim 1, wherein the lifting carriage is constituted by a rectangular frame having attached upon each exterior face of vertical frames thereof two sets of angularly displaced wheels.

21. The AGV according to claim 20, further comprising two sets of bearings upon each external face of the vertical frames of the lifting carriage.

22. The AGV according to claim 1, wherein the fork hanger frame is a rectangular frame having two vertical plates joined at a lower extremity thereof by a horizontal perpendicular plate, two horizontal perpendicular plates, two internal vertical plates, and two attachment plates.

23. The AGV according to claim 22, further comprising a front plate of treated steel to support the two front forks of the lift truck upon a pair of notches.

24. The AGV according to claim 1, wherein the two front forks form a load backrest comprising an upper extremity in hook form.

25. The AGV according to claim 1, wherein the two front forks form a load backrest comprising a lower extremity in hook form.

26. The AGV according to claim 1, wherein the tower comprises within an interior a series of reinforcing parts.

27. The AGV according to claim 1, wherein a lower portion of the tower has an orifice.

28. The AGV according to claim 1, wherein the battery box is formed by two side plates having a cut-out in a lower part and two joining plates comprising handgrips.

29. The AGV according to claim 1, wherein the wheels of the battery box are mounted upon a drive train.

30. The AGV according to claim 1, wherein a base of the battery box comprises a plurality of seats.

* * * * *